United States Patent
Parker et al.

(10) Patent No.: US 9,272,168 B2
(45) Date of Patent: Mar. 1, 2016

(54) ENERGY ABSORBERS, CONNECTORS AND HORIZONTAL LIFELINE SYSTEMS

(75) Inventors: Thomas W. Parker, Jamestown, PA (US); David A. Winslow, Hermitage, PA (US); Eric M. Manson, Franklin, PA (US); Preston L. Anderson, Cranberry, PA (US)

(73) Assignee: Honeywell International Inc., Morristown, NJ (US)

( * ) Notice: Subject to any disclaimer, the term of this patent is extended or adjusted under 35 U.S.C. 154(b) by 1287 days.

(21) Appl. No.: 12/366,909

(22) Filed: Feb. 6, 2009

(65) Prior Publication Data

US 2009/0194366 A1    Aug. 6, 2009

Related U.S. Application Data

(60) Provisional application No. 61/026,530, filed on Feb. 6, 2008, provisional application No. 61/026,653, filed on Feb. 6, 2008.

(51) Int. Cl.

| | |
|---|---|
| *A62B 1/16* | (2006.01) |
| *A62B 35/04* | (2006.01) |
| *E04G 21/32* | (2006.01) |
| *F16F 7/12* | (2006.01) |

(52) U.S. Cl.
CPC ............ *A62B 35/04* (2013.01); *E04G 21/3233* (2013.01); *E04G 21/3261* (2013.01); *F16F 7/123* (2013.01); *F16F 7/128* (2013.01)

(58) Field of Classification Search
CPC ....................................... A62B 35/04

USPC ......... 182/3, 18; 188/371, 372; 292/471, 472; 267/136, 158, 160
See application file for complete search history.

(56) References Cited

U.S. PATENT DOCUMENTS

| | | | |
|---|---|---|---|
| 3,106,989 A | * 10/1963 | Fuchs | 188/375 |
| 3,232,383 A | * 2/1966 | Son Moberg | 188/375 |
| 3,694,028 A | 9/1972 | Andres | |
| 4,637,594 A | * 1/1987 | Saito et al. | 267/47 |
| 5,738,377 A | 4/1998 | Sugiki | |
| 6,279,680 B1 | * 8/2001 | Casebolt | 182/3 |
| 6,394,241 B1 | * 5/2002 | Desjardins et al. | 188/376 |
| 6,457,556 B1 | 10/2002 | Shade | |
| 6,698,544 B2 | 3/2004 | Kurtgis | |
| 6,722,470 B2 | 4/2004 | Carson | |

(Continued)

FOREIGN PATENT DOCUMENTS

| | | |
|---|---|---|
| AU | 697769 B2 | 10/1998 |
| GB | 1060974 | 3/1963 |

(Continued)

*Primary Examiner* — David E Allred
*Assistant Examiner* — Candace L Bradford
(74) *Attorney, Agent, or Firm* — Wood, Phillips, Katz, Clark & Mortimer

(57) ABSTRACT

An energy absorber including a strap including at least a first path of relatively reduced strength extending over at least a portion of the length of the strap. The energy absorber also includes at least a first transition region including a first initial point where tearing begins along the first transition region when a force above a threshold force is applied (to the energy absorber/strap) and a first end point. The first end point is in operative connection with a first point on the first path so that tearing continues along the first path after tearing along the first transition region. A gradual increase in load occurring as tearing occurs along the transition region.

13 Claims, 20 Drawing Sheets

(56) References Cited

U.S. PATENT DOCUMENTS

| | | | |
|---|---|---|---|
| 6,779,630 B2* | 8/2004 | Choate | 182/36 |
| 6,918,464 B2* | 7/2005 | Renton et al. | 182/18 |
| 7,106,205 B2 | 9/2006 | Graef | |
| 7,448,577 B2* | 11/2008 | Sadeck | 244/142 |
| 2002/0079164 A1* | 6/2002 | Choate | 182/36 |
| 2006/0016636 A1* | 1/2006 | Durbic | 182/3 |
| 2012/0159744 A1* | 6/2012 | Lovato | 24/163 R |

FOREIGN PATENT DOCUMENTS

| | | |
|---|---|---|
| GB | 2334319 | 8/1999 |
| WO | WO2009100315 A3 | 8/2009 |

\* cited by examiner

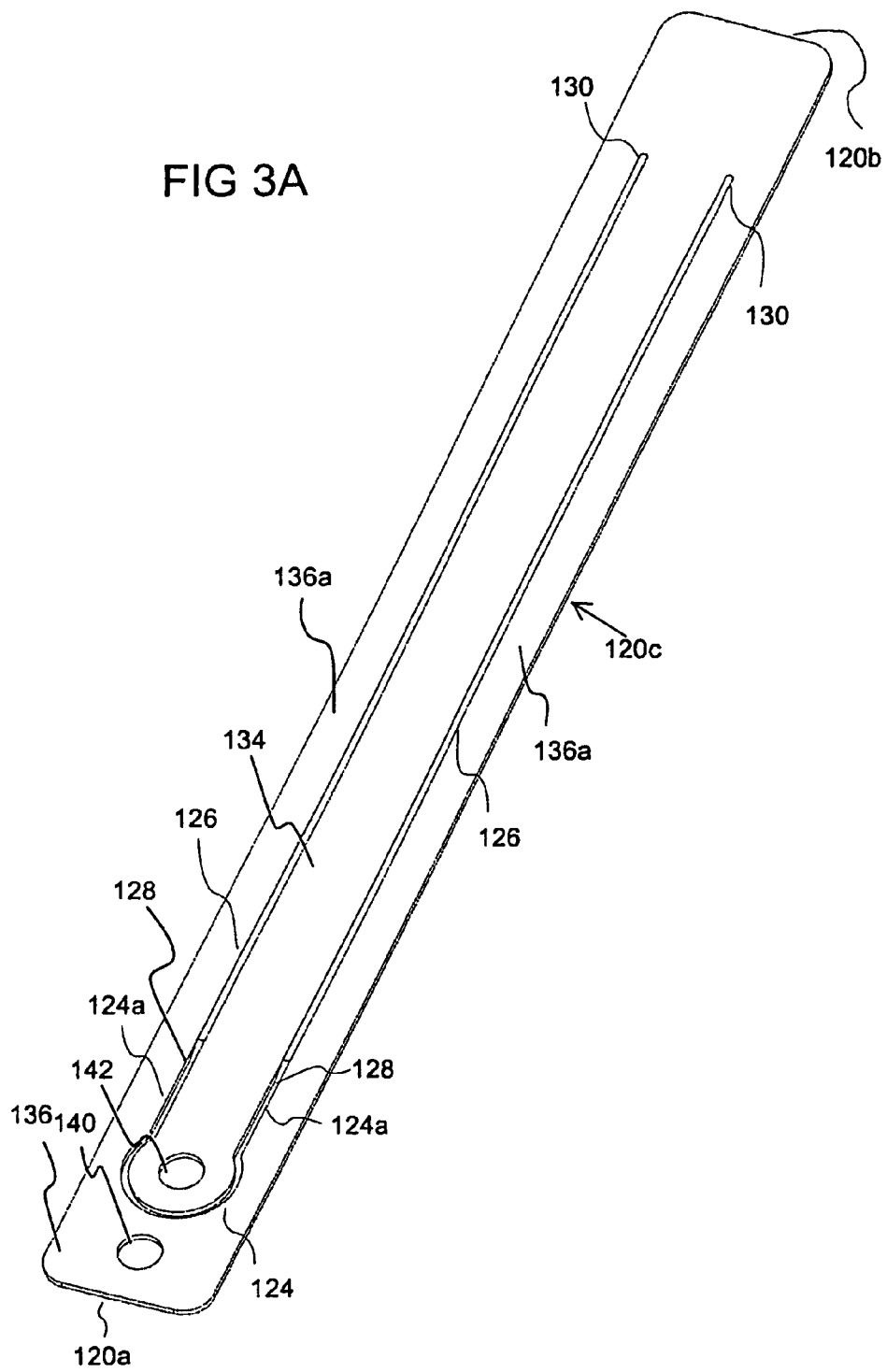

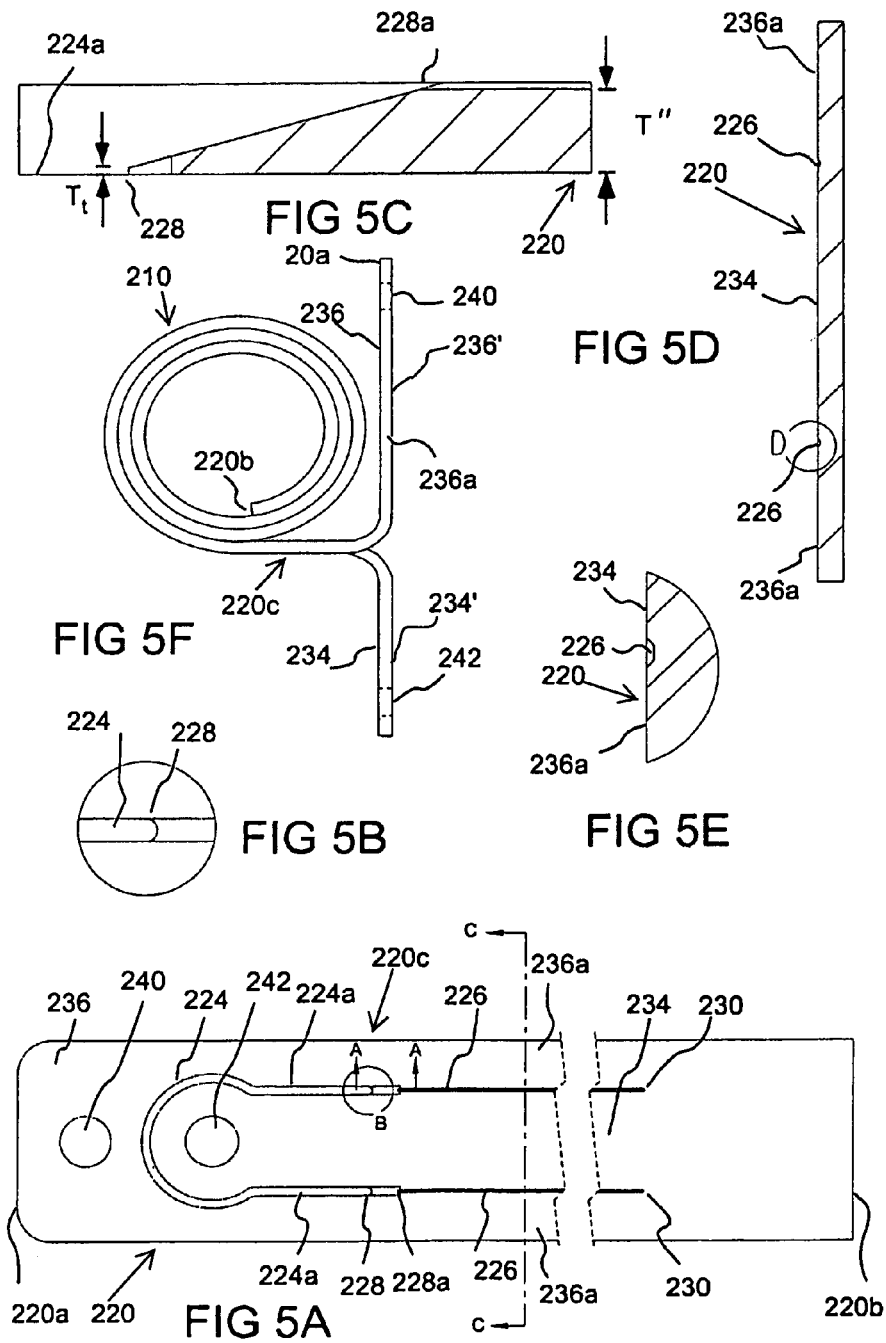

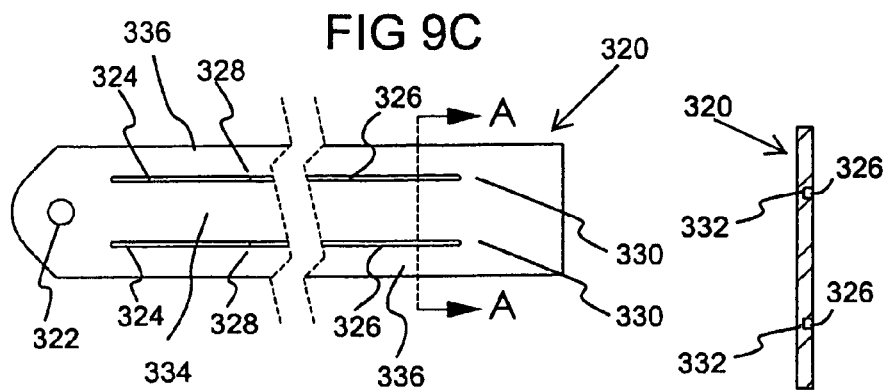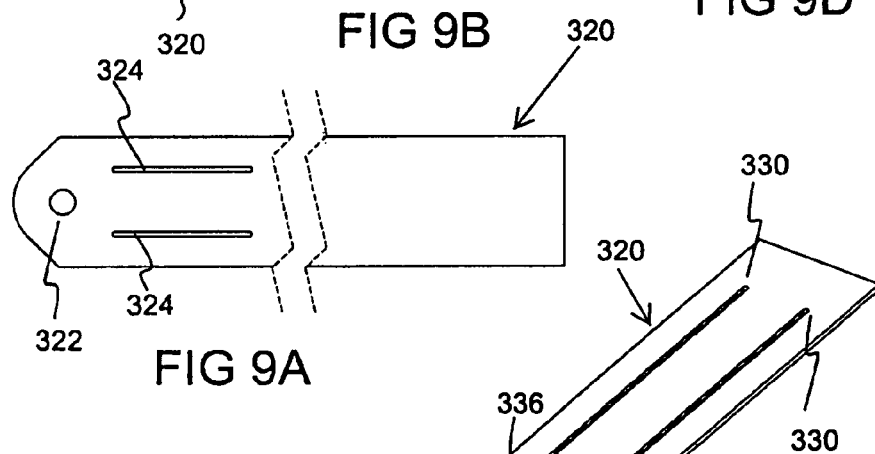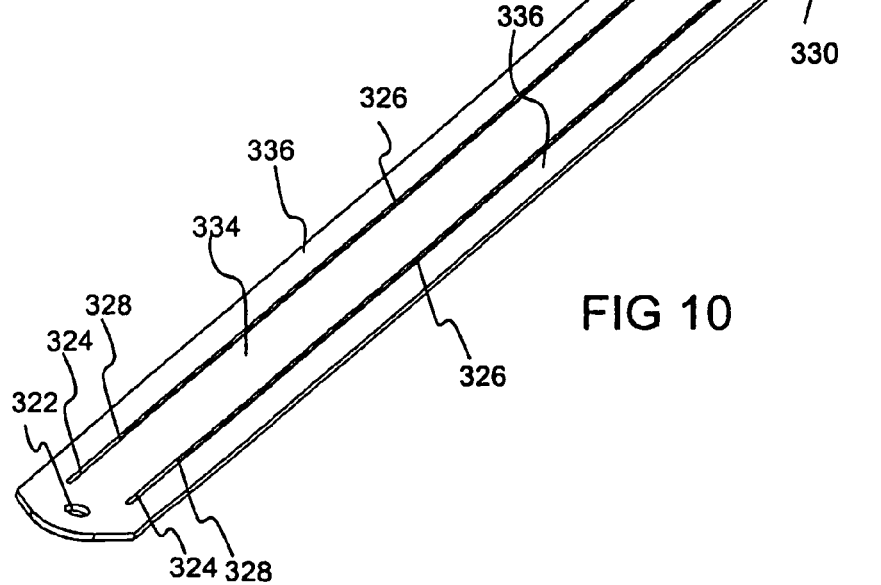

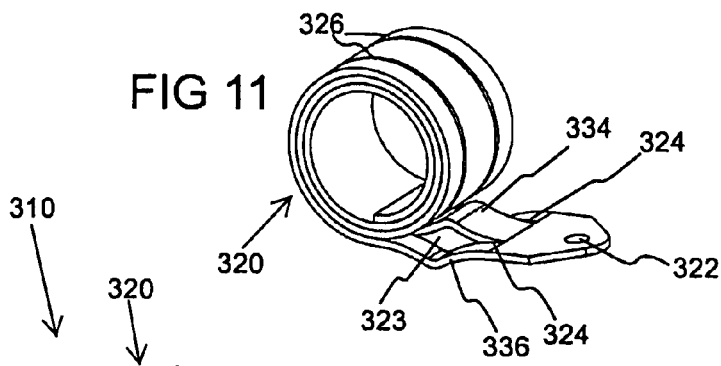
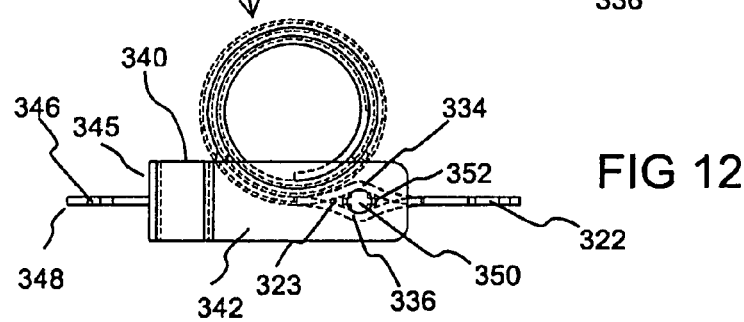
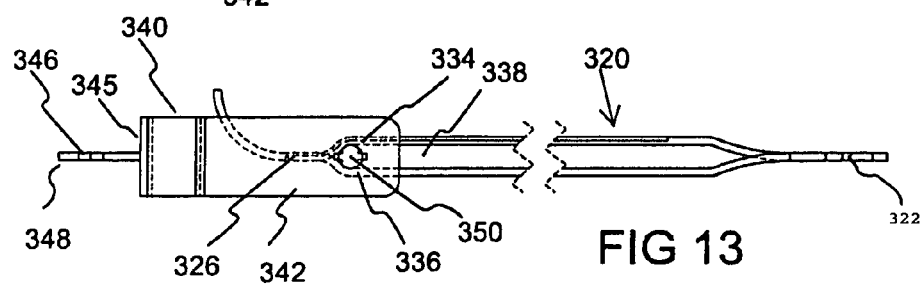
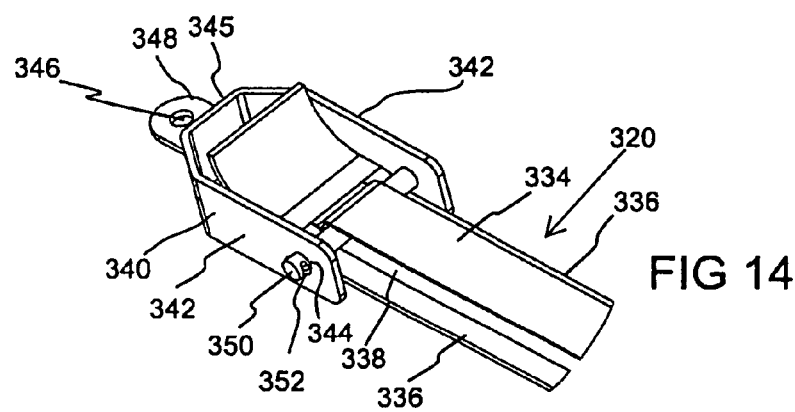

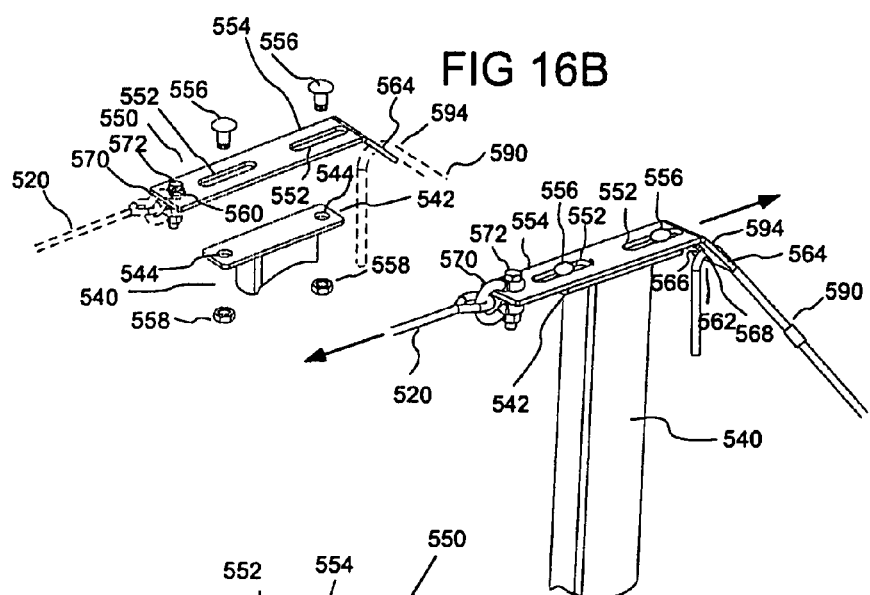
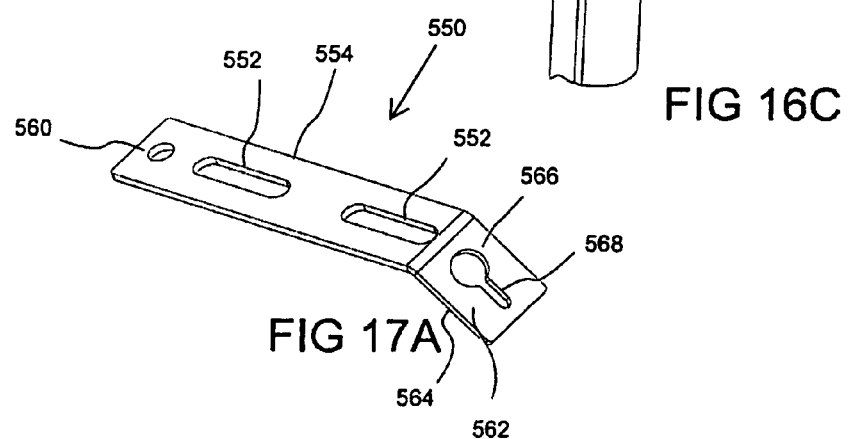
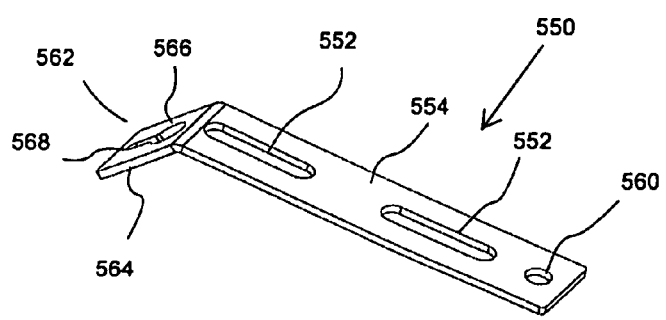

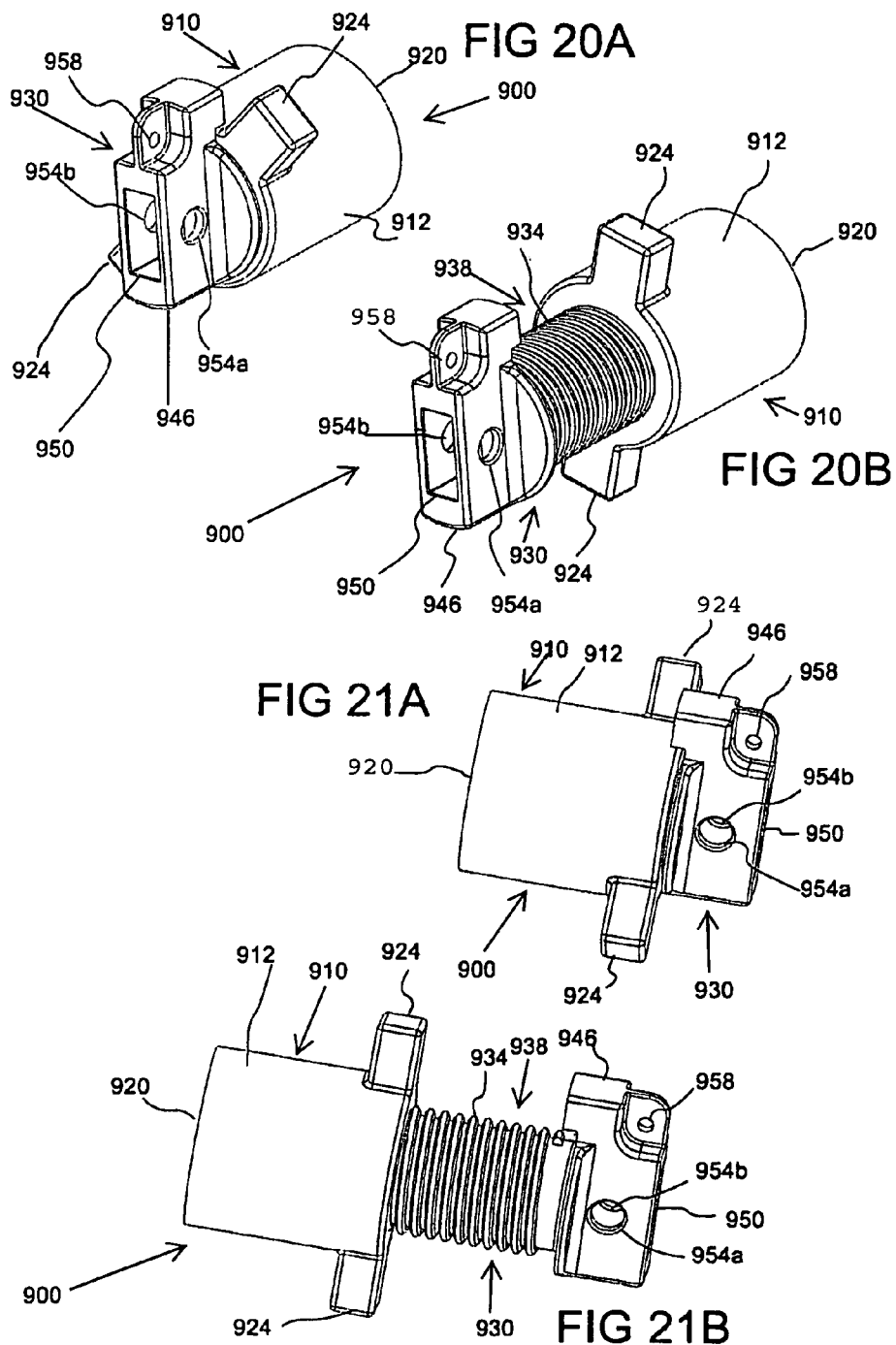

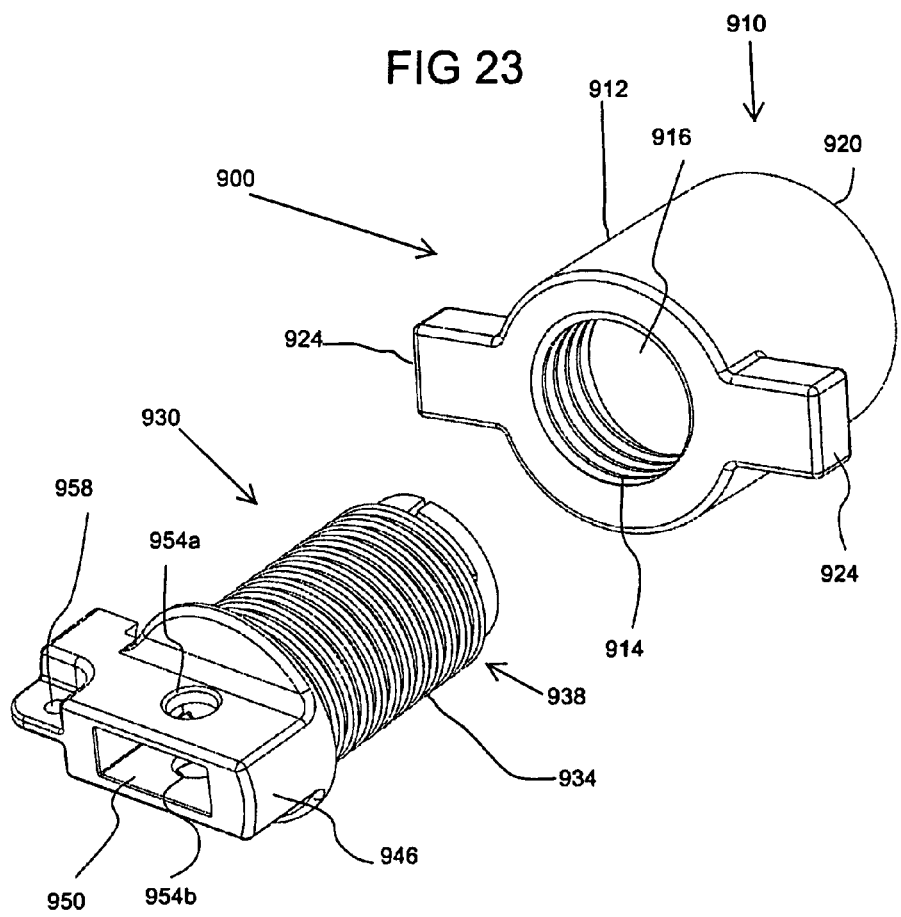

ENERGY ABSORBERS, CONNECTORS AND HORIZONTAL LIFELINE SYSTEMS

CROSS-REFERENCE TO RELATED APPLICATION

This application claims benefit of U.S. Provisional Patent Application Ser. No. 61/026,530, filed Feb. 6, 2008 and U.S. Provisional Patent Application Ser. No. 61/026,653, filed Feb. 6, 2008, the disclosures of which are incorporated herein by reference.

BACKGROUND OF THE INVENTION

The present invention relates to energy absorbers or shock absorbers and energy transferring connectors and, particularly to energy absorbers and connectors for use in connection with safety systems such as horizontal lifeline systems.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

Energy absorbers or shock absorbers absorb energy to, for example, protect against damage to equipment and/or to protect against injury to person(s). Energy absorbers have, for example, been used in fall protection as part of a fall-arresting safety system such as a horizontal lifeline system. Horizontal lifeline systems include a generally horizontal line connected between supports such as stanchions to which safety lines of individual workers can be connected. See, for example, U.S. Pat. No. 6,722,470.

As part of a requirement established by the United States Occupational Safety and Health Administration (OSHA) and the American National Standards Institute (ANSI) horizontal lifeline systems shall be designed to maintain a factor of safety of at least 2. Because of other regulations, fall protection components (for example, connectors etc.) are typically manufacture to have a rating (for example, an ultimate tensile load) of 5,000 lbs. Therefore, for fall protection manufacturers to use components commonly used with other fall protection systems (which components typically have a rating of 5000 lbs. as described above), it is advantageous to prevent loads in horizontal lifeline systems from exceeding 2,500 lbs (that is, 5,000 lbs with a 2:1 safety factor). To maintain minimal cable extension and suitable overall fall clearance distance below the workers using the horizontal lifeline, it is preferably to maintain loads as close to 2,500 lbs. as possible. Nonetheless, in certain systems, horizontal lifeline stanchions can be subjected to substantial force.

The purpose of an energy or shock absorber in a horizontal lifeline system is to absorb the energy from a fall and thereby limit the forces to below a certain force (for example, the 5000 lbs of force with a 2:1 safety factor). Although there are many types of energy absorbers that perform this function, a design problem common to all such energy absorbers is how to accommodate the force requirements at initial deployment or activation. Regardless of whether an energy absorbers performs consistently and within design and regulatory requirements during the continuous stage following initial deployment, care must be taken during design of the energy absorber to ensure that such requirements are satisfied during the dynamic, initial activation of the energy absorber.

In one type of energy absorber, a strip of metal is connected between two elements so that the metal tears when subjected to force exceeding a certain threshold force across the two elements. U.S. Pat. No. 6,279,680 discloses the use of such an energy absorber in a horizontal lifeline system. Tearing of the metal in this type energy or shock absorber absorbs energy. To ensure that such an energy absorber satisfies design and regulatory requirements during initial activation, it can be necessary for the manufacture to subject the energy absorber to an initial "pre-tear" process in which the energy absorber is subjected to sufficient force to initiate a small degree of tearing.

Several other problems are associated with energy absorbers including a strip or strap of material that is torn. For example, such energy absorbers typically tear such that one section of the strap thereof is pulled to move in a first direction, while a second section of the strap is pulled to move in a second direction, generally opposite of the first direction. Although the strap can, for example, be coiled by the manufacturer so that the energy absorber originally takes up little space, the activation and full (or even partial) deployment (including both uncoiling and tearing) of the energy absorber results in a spent strap that is relatively large in total length/area. Such an energy absorber may not be suitable for uses in which there is limited space for the spent energy absorber or in which it is desirable to limit total displacement.

Although a number of energy absorbers are available for use in connection with fall protection and other systems, it remains desirable to develop improved energy absorbing devices, systems and methods.

SUMMARY OF THE INVENTION

In a number of embodiments, the present invention provides energy absorbers or energy absorber systems that include one or more transition regions in which tearing or other deformation to absorb energy is dynamically initiated during use. The transition region of the present invention has a defined design that results in a predictable change in load over the length of the transition region. In the case of an energy absorber for a horizontal lifeline system, for example, spikes in load above a predetermined value (for example, 2500 lbs. as described above) are preferably avoided during the dynamic initiation of energy absorption and a generally constant load at or below the predetermined value is maintained thereafter. The generally constant load is preferably as close to the predetermined value as possible. In several embodiments of the present invention, a gradual increase in load occurs over the transition region until a path of reduced strength is reached over which the load is generally constant.

In one aspect, the present invention provides an energy absorber including a strap including at least a first path of relatively reduced strength extending over at least a portion of the length of the strap. The energy absorber also includes at least a first transition region including a first initial point where tearing begins along the first transition region when a force above a threshold force is applied (to the energy absorber/strap) and a first end point. The first end point is in operative connection with a first point on the first path so that tearing continues along the first path after tearing along the first transition region. A gradual increase in load occurs as tearing occurs along the transition region. Load in the transition region and along the first path preferably does not exceed a predetermined load value (for example, 2500 pounds).

In several embodiments, a thickness of the strap in the first transition region increases over a length of the first transition region from a first initial thickness at the first initial point (which is less than that of the thickness of the strap) to a first end thickness at the first end point which is greater than the first initial thickness.

In a number of embodiments, the first path is a first groove and the final thickness at the first end point of the first transition region is equal to the thickness of the strap at the first point on the first groove. The first end point and the first point on the first groove can, for example, be the same point.

The first initial thickness can, for example, be approximately zero. The first initial thickness can alternatively be greater than zero.

In several embodiments, the strap is a metal strap. The strap can, for example, include a first end, a second end, and an intermediate section between the first end and the second end. The strap can include a generally U-shaped slot passing through the strap in the first end that separates the first end into a first connector section and a second connector section. The first connector section and the second connector section can, for example, be deformed to extend in different directions away from one another. A first connector passage can be formed in the first connector section, and a second connector passage can be formed in the second section. In several embodiments, the first transition region extends from the vicinity of a first end of slot to a vicinity of the first point on the first path.

A second transition region can extend from a vicinity of a second end of the slot to a vicinity of a first point on a second path of relatively reduced strength, so that tearing continues along the second path after tearing along the second transition region. The thickness of the strap increases over the length of the second transition region from a second initial thickness at a second initial point of the second transition region to a second end thickness at a second end point of the second transition region which is greater than the second initial thickness of the second transition region. A gradual increase in load occurs as tearing occurs along the second transition region when a force above a threshold force is applied.

The first path and the second path can, for example, be lines of decreased thickness formed in the strap. In several embodiments, the first path has a generally constant thickness over the length thereof, and the second path has a generally constant thickness over the length thereof.

In a number of embodiments, the first path extends from the end point of the first transition region to a position proximate the second end of the strap, and the second path extends from the end point of the second transition region to a position proximate the second end of the strap. The second end of the strap and a portion of the intermediate portion of the strap can be coiled in a spiral fashion inside a remainder of the intermediate portion of the strap, whereby when the first connector section and the second connector section are pulled in opposite directions with sufficient force, the connector tears and uncoils to absorb energy. In several such embodiments, the first path and the second path are lines of decreased thickness formed in the strap. As described above, the first path can have a generally constant thickness over the length thereof, and the second path can have a generally constant thickness over the length thereof.

In a number of embodiments, the first transition region includes a step change in thickness from zero to the first initial thickness at the first initial point of the first transition zone, and the thickness of the strap in the first transition region increases from the first initial thickness to the first end thickness which is equal to a thickness of the strap at the first point on the first path. The second transition region can also include a step change in thickness from zero to the second initial thickness at the second initial point of the second transition region, and the thickness of the strap in the second transition region increases from the second initial thickness to the second end thickness which is equal to a thickness of the strap at the first point on the second path.

In several embodiments, the energy absorber includes an abutment element positioned in relation to the first transition region such that force applied to the strap above the threshold value forces the strap against the abutment element and causes tearing of the strap generally along the first transition region and subsequently along the first path and causes movement of the strap relative to the abutment element.

In another aspect, the present invention provides a horizontal lifeline system, including a horizontal lifeline and an energy absorber in operative connection with the horizontal lifeline. As described above, the energy absorber includes a strap including at least a first path of relatively reduced strength over at least a portion of the length thereof, and at least a first transition region including a first initial point where tearing begins along the first transition region when a force above a threshold force is applied and a first end point. The first end point is in operative connection with a first point on the first path so that tearing continues along the first path after tearing along the first transition region. A gradual increase in load occurs as tearing occurs along the transition region.

As also described above, a thickness of the strap in the first transition region can increase over a length of the first transition region from a first initial thickness at the first initial point, which is less than that of the thickness of the strap, to a first end thickness at the first end point which is greater than the first initial thickness.

In several embodiments, the horizontal lifeline of system further includes at least one stanchion system. The stanchion system includes a stanchion post and a connector moveably connected to the stanchion post. The connector includes a first connector element to be operatively connected to the horizontal lifeline and a second connector element to connect to an anchor.

The connector can include at least a first extending slot. The stanchion system can further include a first attachment member that passes through the first slot to connect the connector to the stanchion post so that the connector can slide relative to the first attachment member along the length of the first slot.

The connector and the energy absorber can, for example, be in operative connection with the horizontal lifeline in series. The connector and the energy absorber can, for example, be in adjacent connection.

In another aspect, the present invention provides a method of providing a gradual increase in load using an energy absorber. The energy absorber includes a strap which includes at least a first path of relatively reduced strength extending over at least a portion of the length of the strap which results in tearing of the strap generally along the first path during energy absorption. The method includes providing a first transition region in operative connection with a first point on the first path (that is, where tearing begins along the first path). A gradual increase in load occurs as tearing occurs along the transition region when a force above a threshold force is applied. In several embodiments, a thickness of the strap in the first transition region increases over a length of the first transition region from a first initial thickness at a first initial point, which is less than that of the thickness of the strap, to a first end thickness at a first end point, which is greater than the first initial thickness.

In a further aspect, the present invention provides an energy absorber assembly, including a strap including at least one path of relatively reduced strength extending over at least a portion of the length of the strap, and an abutment element positioned in relation to the path such that force applied to the strap above a predetermined threshold value forces the strap against the abutment element and causes deformation of the strap generally along the path and causes movement of the strap relative to the abutment element.

In a number of embodiments, the strap includes two paths of reduced strength. Each of the two paths of reduced strength can, for example, extend generally longitudinally over at least a portion of the strap to define an inner section of the strap between the two paths and outer sections of the strap laterally outside each of two paths. The inner section can be deformed over a portion thereof in a first direction. The outer sections adjacent the deformed portion of the inner section can be deformed in a second direction generally opposite of the first direction so that a passage is formed in a generally lateral direction between the inner section and the outer sections. The abutment element can be positioned within the passage such that force applied to the strap above the predetermined threshold value causes the inner section to deform around the abutment element in generally the first direction and the outer sections to deform around the abutment element in generally the second direction while strap moves relative to the abutment element.

At least a portion of at least one of the two paths can be formed so that deformation of the strap requires tearing of the strap. At least a portion of each of the two paths can be formed so that deformation of the strap requires tearing of the strap along each of the two paths.

Each of the two paths can, for example, include a continuous groove formed in the strap. The grooves can extend generally parallel to each other to a point spaced from a longitudinal end of the strap.

In several embodiments, the strap is coiled so that the strap uncoils and deforms as it is moves relative to the abutment element. The energy absorber assembly can further include a support member to which the abutment element is attached. The support member can, for example, include a first side member and a second side member. The coiled strap can be positioned between the first side member and the second side member. The abutment element can, for example, be connected to the first side member at a first end of the abutment element and can be connected to the second side member at a second end of the abutment element. The abutment element can, for example, be a generally cylindrical member. The first side member can include a first passage through which the first end of the abutment element is passed, and the second side member can include a second passage through with the second end of the abutment element is passed.

The strap can include an attachment member to attach the strap to a first member. The support member can also include an attachment member to attach the support to a second member.

In a further aspect, the present invention provides fall protection safety system including an energy absorber or energy absorber assembly as described above.

The fall protection safety system can further include a horizontal lifeline in operative connection with the energy absorber.

The present invention also provides methods of providing fall protection using energy absorbers, energy absorber assemblies or energy absorber systems of the present invention.

In another aspect, the present invention provides a stanchion or stanchion system for use in connection with a lifeline including a stanchion post and a connector moveably connected to the stanchion post. The connector includes a first connector element (for example, a passage) to connect to the lifeline and a second connector element (for example, a second passage) to connect to an anchor. The connector can also, for example, include at least a first extending slot. The stanchion can further include a first attachment member that passes through the first slot to connect the connector to the stanchion post so that the connector can slide relative to the first attachment member along the length of the first slot.

In several embodiments, the connector includes at least a second extending slot, and the stanchion further includes a second attachment element that passes through the second slot to connect the connector to the stanchion post so that the connector can slide relative to the second attachment element along the length of the second slot. The first slot and the second slot can, for example, extend generally longitudinally.

The first attachment element can, for example, be positioned in the vicinity of a first end of the connector and the second attachment element can be positioned in the vicinity of a second end of the connector.

The first slot, the second slot (when present) and the first attachment element can, for example, be formed in a first, generally flat section of the connector. The second attachment element can, for example, be formed in a second section of the connector. In several embodiments, the second section of the connector is formed at an angle from the first section of the connector.

In a number of embodiments, the first slot and the second slot are generally parallel. The first slot and the second slot can be generally collinear.

The stanchion post can, for example, include a generally flat upper surface upon which the first section of the connector is slidably connected.

In another aspect, the present invention provides a horizontal lifeline system including a horizontal lifeline and at least one stanchion or stanchion system as described above that is connected with the horizontal lifeline.

The present invention, along with the attributes and attendant advantages thereof, will best be appreciated and understood in view of the following detailed description taken in conjunction with the accompanying drawings.

BRIEF DESCRIPTION OF THE DRAWINGS

FIG. 3A illustrates a perspective view of another embodiment of an energy absorber of the present invention including a gradual or ramped transition at the point wherein tearing is initiated.

FIG. 5A illustrates a top plan view of another embodiment of an energy absorber of the present invention including a relatively small abrupt transition followed by a gradual or ramped transition at the point wherein tearing is initiated.

FIG. 5B is an enlarged top plan view of area B of FIG. 5A.

FIG. 5C is an enlarged cross-sectional view the transition region of the energy absorber of FIG. 5A along section A-A.

FIG. 5D is a cross-sectional view of the energy absorber of FIG. 5A along section C-C.

FIG. 5E is an enlarged cross-sectional view of area D of FIG. 5D.

FIG. 5F is a side view of the energy absorber of FIG. 5A in a coiled state

FIG. 9A illustrates a top plan view of the coiled strap component of the energy absorber of FIG. 7 in an uncoiled state (prior to coiling).

FIG. 9B illustrates a side view of the strap component of the energy absorber of FIG. 7 in an uncoiled state (prior to coiling).

FIG. 9C illustrates a bottom plan view of coiled strap component of the energy absorber of FIG. 7 in an uncoiled state (prior to coiling).

FIG. 9D illustrates a cross-sectional view of the strap component along section A-A set forth in FIG. 9C.

FIG. 10 illustrates a top perspective view of the strap of the energy absorber assembly of FIG. 7 in an uncoiled state.

FIG. 11 illustrates a perspective view of the strap in a coiled state.

FIG. 12 illustrates a side view of the energy absorber assembly of FIG. 1 when tension is first applied.

FIG. 13 illustrates a side view of the energy absorber assembly of FIG. 7 after tension has been applied and the coiled strap has been elongated.

FIG. 14 illustrates a perspective view of the energy absorber assembly of FIG. 7 after tension has been applied and the coiled strap has been elongated.

FIG. 16B illustrates a perspective view of an embodiment of a connector used in connection with the stanchion posts and horizontal lifeline of the system of FIG. 16A.

FIG. 17A illustrates a perspective view of the connector of FIG. 16B.

FIG. 17B illustrates another perspective view of the connector of FIG. 16B.

FIG. 20A illustrates an enlarged rear perspective view of a crossbar connector of the stanchion system of FIG. 19A in a fully contracted state.

FIG. 20B illustrates an enlarged rear perspective view of the crossbar connector in a fully expanded state.

FIG. 21A illustrates an enlarged side perspective view of the crossbar connector in a fully contracted state.

FIG. 21B illustrates an enlarged side perspective view of the crossbar connector in a fully expanded state.

FIG. 23 illustrates an enlarged front perspective view of the crossbar connector wherein the first section of the connector is disconnected from the second section of the connector.

DETAILED DESCRIPTION OF THE INVENTION

Several embodiments of the present invention are discussed herein in connection with use of energy absorbers of the present invention in a fall protection systems such as a horizontal lifeline systems. However, one skilled in the art appreciates that the energy absorbers of the present invention can be used in a wide variety of systems in which energy absorption in required to, for example, protect against damage to equipment and/or to protect against injury to individuals.

As used herein and in the appended claims, the singular forms "a," "an", and "the" include plural references unless the content clearly dictates otherwise. Thus, for example, (unless clearly indicated otherwise) reference to "a path" includes a plurality of paths and equivalents thereof known to those skilled in the art, and so forth, and reference to "the path", is a reference to one or more such paths and equivalents thereof known to those skilled in the art, and so forth.

Terms such as "left", "right", "rearward", "forward", "upper", "lower" and like terms are used herein to describe the relative position of elements of devices and systems of the present invention with reference to the orientation of the systems set forth in the accompanying drawings.

The energy absorbers of the present invention can, for example, be used as a cable tension limiter in a horizontal life line system. In use in fall protection systems such as horizontal lifeline systems, the primary functions of the energy absorbers of the present invention are to dissipate energy and to limit deceleration forces which are imposed on a body during fall arrest.

In several embodiments, energy absorbers of the present invention include a strap (which can be coiled) that is deformed and torn while one section of the strap is pulled to move in a first direction and a second section of the strap is pulled to move in a second direction. However, unlike currently available energy absorbers in which a strap is torn to absorb energy, the straps of the present invention include on or more transition regions in the area in which tearing is initiated (during use and after application of a threshold force) which enable control of load forces experience during the dynamic initiation of tearing (for example, upon fall of an individual attached to a horizontal lifeline system).

Figure 1:
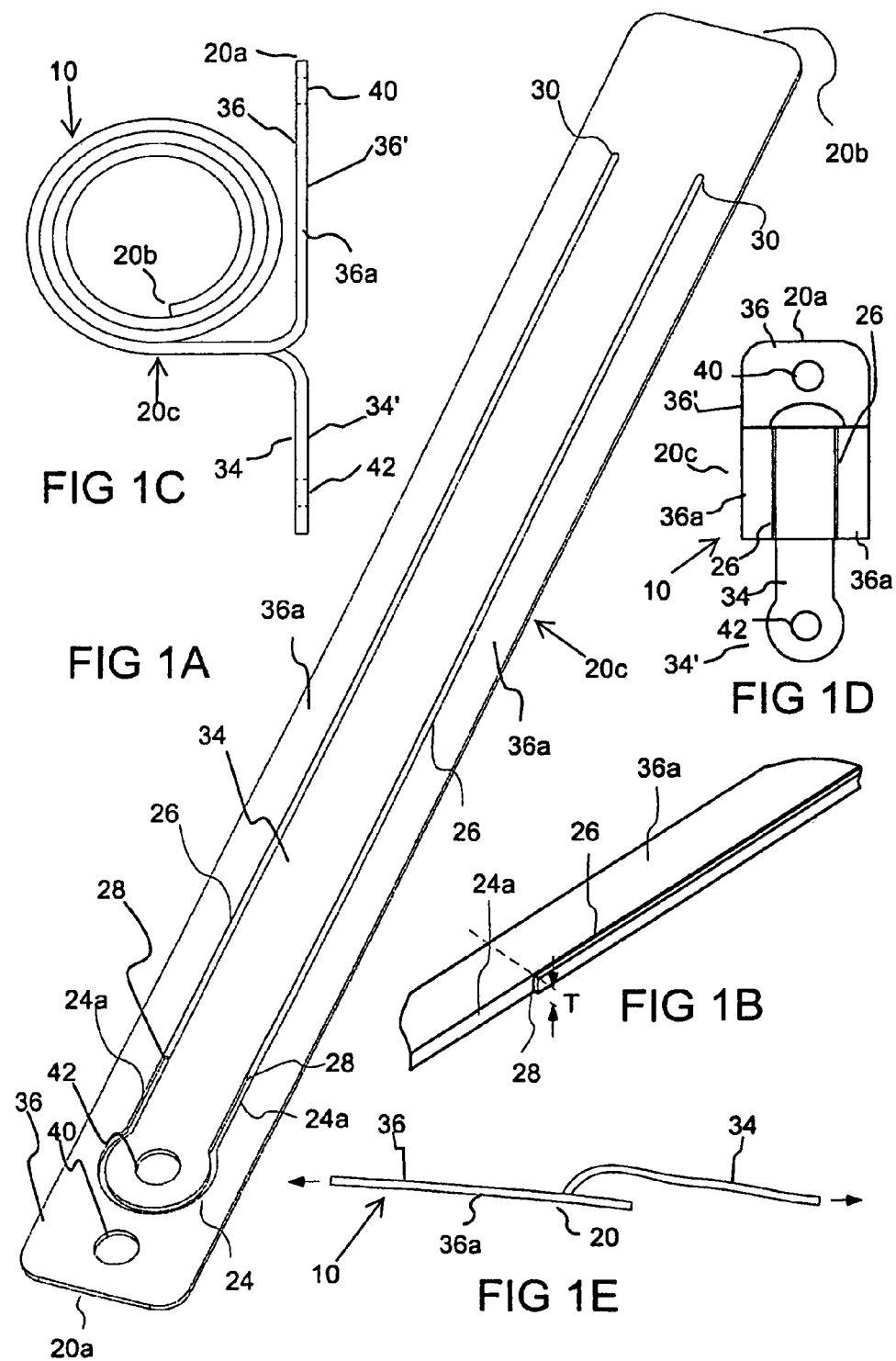
FIG. 1A illustrates a perspective view an embodiment of an energy absorber including an abrupt transition at the point wherein tearing is initiated, wherein the strap of the energy absorber is in an extended state.
FIG. 1B illustrates an enlarged, perspective cutaway view of the abrupt transition of the energy absorber of FIG. 1A.
FIG. 1C illustrates a side view of the energy absorber of FIG. 1A wherein the strap is in a coiled state.
FIG. 1D illustrates a top view of the energy absorber of FIG. 1A wherein the strap is in a coiled state.
FIG. 1E illustrates a side view of the energy absorber of FIG. 1A in a spent (uncoiled and torn) state.

FIGS. 1A through 1E illustrates an energy absorber 10 including a strap 20 (for example, a metal strap). In one embodiment, the strap was fabricated from stainless steel and was approximately 30 inches long, 3 inches wide, and ⅛" of an inch thick. Strap 20 extends lengthwise between a first end 20a and a second end 20b. In the illustrated embodiment, strap 20 includes a generally U-shaped slot 24 including longitudinally and generally parallel extending sections 24a. Slot 24 passes completely through the strap 20. At a first end of extending sections 24a, slots 24 forms an arcuate path between extending sections 24a. Strap 20 also includes two generally parallel, longitudinally extending paths or lines of reduced strength (that is, of reduced strength compared to portions of strap 20 not on the path or line) in the form of two grooves or notches 26 which, in the illustrated embodiment, are formed in the upper side of strap 20 along an intermediate section 20c of strap 20. Grooves 26 are generally collinear with the extending sections 24a of slot 24. In the illustrated embodiment, grooves 26, as well as intermediate section 20c begin at transition points 28, corresponding to the second ends of extending sections 24a and extend to points 30 which are spaced from a second end 20b of the strap 20. In the embodiment of FIG. 1A, grooves 26 are of uniform depth and leave thinner sections 32 of material in strap 20 as seen, for example, in the FIG. 1B. Slot 24 and grooves 26 divide strap 20 into a first section 34 and a second sections 36. First section 34 divides outer section 36 over the length of intermediate section 20c into outer strips 36a. A passage 40 extends through first section 34 to, for example, receive a connector. Similarly, a passage 42, positioned generally centrally within the arcuate section of slot 24 extends through second section 36 to receive a second connector.

As known in the art, strap 20 can, for example, be deformed into the configuration illustrated in FIG. 1C. In the coiled configuration of FIG. 1C, second end 20b of strap 20 and a portion of intermediate portion 20c thereof are rolled or coiled within the remainder of the intermediate portion in a generally spiral manner. The first ends of first section 34 and second section 36 can be bent in opposite directions away from intermediate portion 20c in, for example, a manner that they extend generally perpendicular to intermediate portion 20c and generally parallel to one another, thereby forming connector sections 34' and 36' (defined by slot 24), respectively (see, for example, FIGS. 1C and 1D). Energy absorber 10 can then be connected in series between two other members via passages or holes 40 and 42. Coiling energy absorber 10 results in a compact volume while enhancing energy absorption. In that regard, energy is absorbed both by tearing of strap 20 along the path defined by grooves 26 and by uncoiling or strap 20. A spent (uncoiled and torn) strap 20 is illustrated in FIG. 1E.

Figure 2:
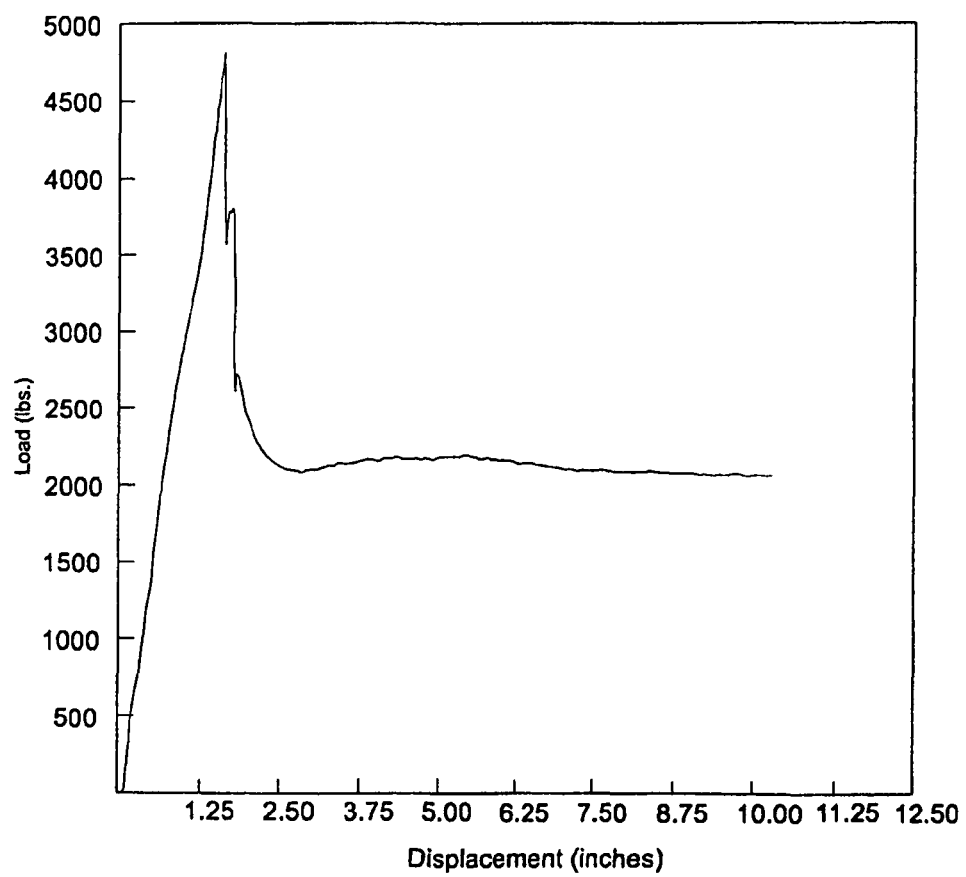
FIG. 2 illustrates a plot of load as a function of displacement for the energy absorber of FIG. 1A showing a large spike in load upon initiation of tearing and before a generally constant level of load is achieved.

As illustrated, for example, in FIG. 1B, in the embodiment of FIGS. 1A through 1E an abrupt transition or step change occurs at transition point 28 between extending sections 24a of slot 24 and grooves 26. In that regard, as illustrated in FIG. 1B, at transition points 28, the thickness of strap 20 changes from 0 (slot 24 passes through strap 20) to a thickness T (the thickness of strap 20 within grooves 26) in a step change. It is at transition point 28 that strap 20 begins to tear upon activation/deployment thereof. As illustrated in FIG. 2, an abrupt transition or step change at transition point 28 can result in a relatively large spike in load upon initiation of tearing. In the embodiment studied in FIG. 2, the peak load or approximately 4800 lbs during the dynamic initiation of tearing exceeds OSHA and ANSI standards (5000 lbs of force with a 2:1 safety factor).

Tests such as illustrated in FIG. 2 were performed using a Tinus-Olsen 30,000 lb. capacity tensile test machine. This type of equipment is commonly used in the industry and can measure force vs. displacement, force vs. time, and other types of tensile measurements. The type of static test set forth in FIG. 2 assists in predicting dynamic performance of a shock absorber. As discussed above, the target force for the test device was below 2,500 pounds to ensure that the 2 to 1 safety factor established by OSHA and ANSI codes (that is, 5000 lbs of force with a 2:1 safety factor), which allows the use of standard 5,000 lb. fall protection hardware. The force is also preferably maintained as high as possible (that is, near the limit of 2,500 lbs.) to limit deflection in a horizontal lifeline during a fall, thereby reducing the fall clearances required for the system. The above two criteria impose tight limits on the performance of horizontal lifeline system devices.

Figure 3B:
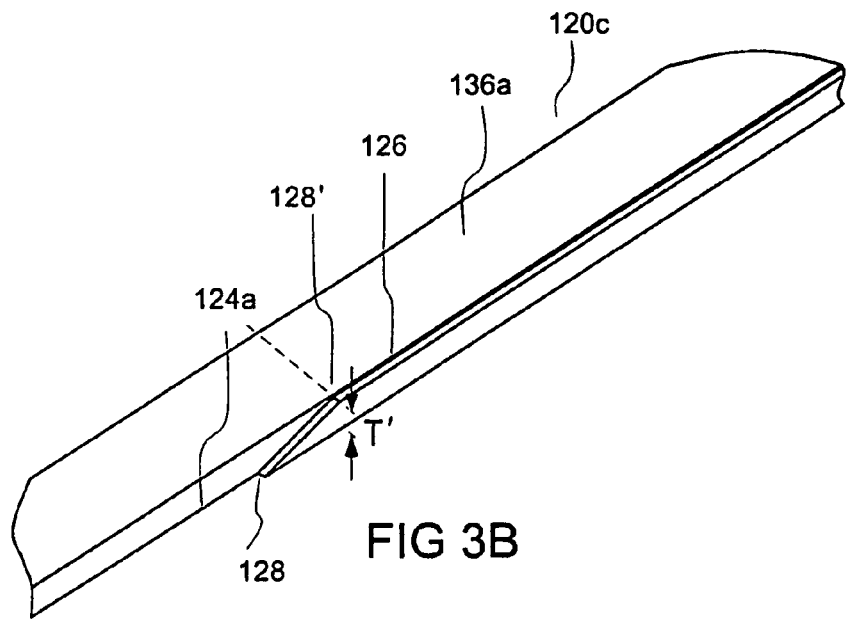
FIG. 3B illustrates an perspective cutaway view of the gradual or ramped transition of the energy absorber of FIG. 3A.
Figure 3C:
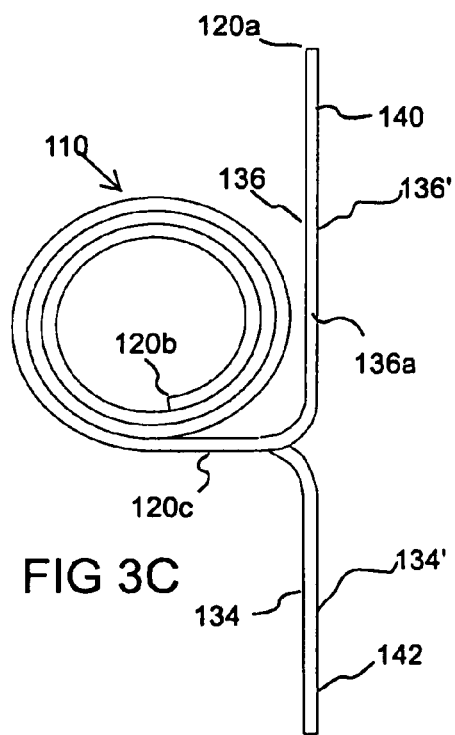
FIG. 3C illustrates a side view of the energy absorber of FIG. 3A wherein the strap is in a coiled state.
Figure 4:
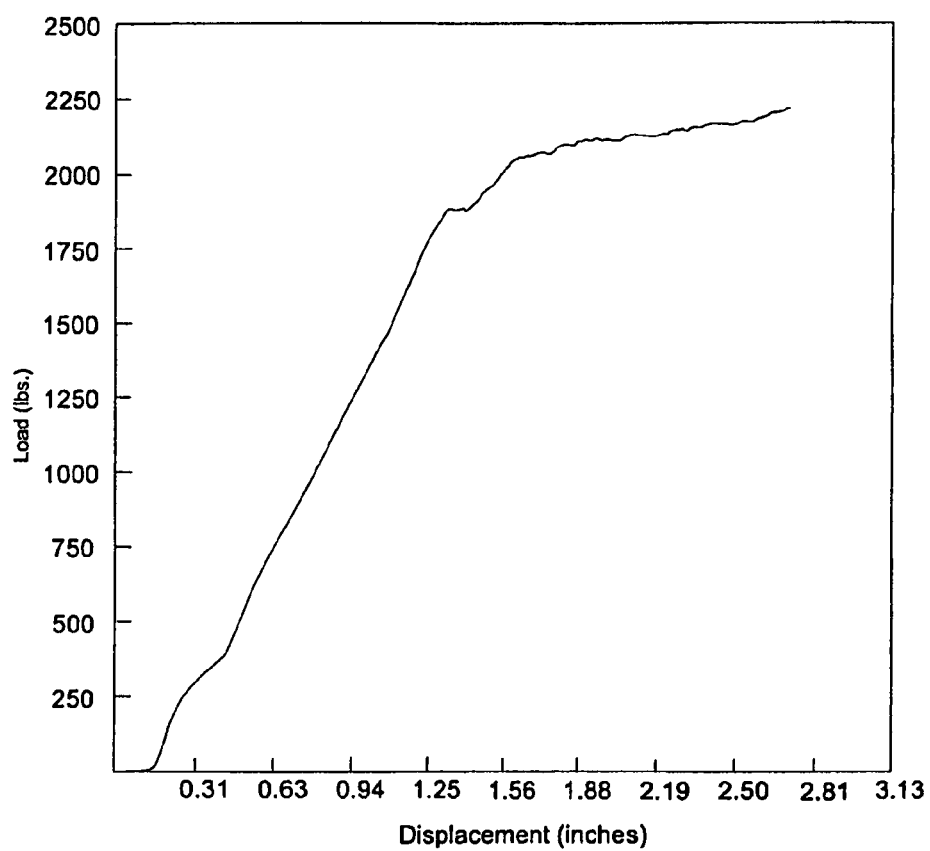
FIG. 4 illustrates a plot of load as a function of displacement for the energy absorber of FIG. 3A showing a gradual increase in load after initiation of tearing and before a generally constant level of load is achieved.
Figure 5G:
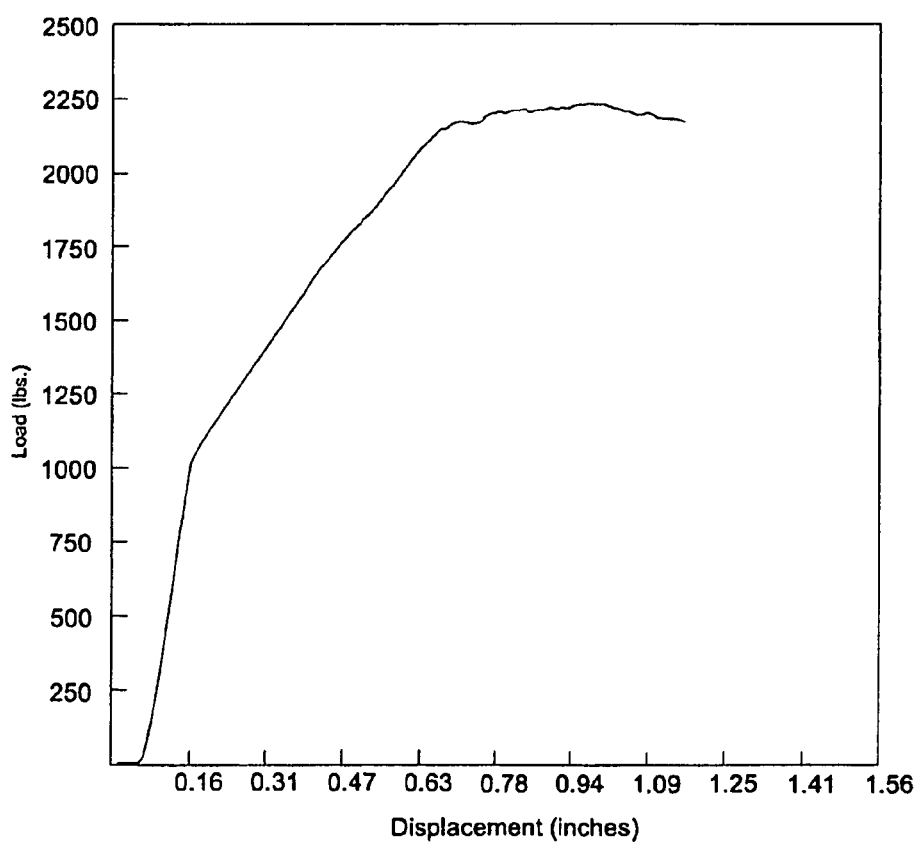
FIG. 5G illustrates a plot of load as a function of displacement for the energy absorber of FIG. 5A showing an initial, relative steep increase in load followed by a more gradual increase in load after initiation of tearing and before a generally constant level of load is achieved.

FIG. 3A through illustrate another embodiment of an energy absorber 110 of the present invention. In most respects, energy absorber 110 is identical to energy absorber 10 and like components are numbered similarly to corresponding components of energy absorber 10 with addition of 100 thereto. The overall dimensions of strap 120 were the same as strap 20. However, unlike energy absorber 10, there is no abrupt change in thickness from 0 to thickness T' (the generally constant thickness within grooves 126 over the length of intermediate section 120c) at transition point 128. To the contrary, the change in thickness between 0 and T' occurs over a defined (nonzero) distance or transition region between an initial transition point 128 (wherein a nonzero thickness first occurs) and a transition end point 128' wherein the thickness reaches the value T'. In the embodiment of FIGS. 3A through 3D, for example, the transition in thickness in the transition region between points 128 and 128a is a generally linear gradual transition or ramp. In the study of FIG. 4, it is seen that the load force increases gradually during the dynamic initiation of tearing in the embodiment of FIGS. 3A through 3D. The spike in peak load observed FIG. 2 is eliminated.

The manner in which the thickness of the strap is increased over the transition region can be readily adjusted using, for example, engineering principles and standard material testing techniques to create a desired load behavior during the dynamic initiation of tearing depending on such factors such as the material of the strap, the dimensions of the slot, the dimensions of the grooves etc. For example, the ramp angle of the transition region can be changed. In general, a steep ramp angle will result in a greater slope in the load versus displacement plot during the dynamic initiation of tearing phase. The change in thickness over the transition region need not be linear. The change can, for example, be curvilinear. Furthermore, the change in thickness over the transition region need not be smooth transition. In that regard, one or more step transitions (in which thickness is changed in a generally vertical or stepwise manner at one or more points along the transition region) can be used.

For example, FIGS. 5A through 5F illustrates another embodiment of an energy absorber 210 of the present invention. In most respects, energy absorber 210 is identical to energy absorber 10 and like components are numbered similarly to corresponding components of energy absorber 10 with addition of 200 thereto. However, like energy absorber 110 (and unlike energy absorber 10), there is no abrupt change in thickness from 0 to thickness T''' (the generally constant thickness within grooves 226 over the length of intermediate section 220c) at initial point 228 of the transition region (or at any other point). Unlike strap 120 of energy absorber 110, strap 220 include a step change in thickness at transition point 228. In that regard, at initial transition point 228, the thickness changes in a stepwise manner by an amount $T_t$ which is less than T''' (see FIG. 5C). In the transition region (that is, between initial point 228 and end point 228a), in the embodiment of FIGS. 5A through 5F, the thickness change is a generally linear, ramped change from $T_t$ to T'''. The resultant graph of load versus displacement is set forth in FIG. 5G. As illustrated in FIG. 5G, there is an initial, relatively steep slope in the dynamic region corresponding to the initiation of tearing of the resultant curve corresponding to the step transition in thickness at transition point 228. An initial stepwise change or steeply sloped change at transition point 228 (where tearing initiates) can, for example, be used to prevent tearing from initiating at too low of a force (that is, to adjust a predetermined threshold force at which tearing begins).

In several embodiments, the present invention thus provides for a more gradual increase in load than provided by previous energy absorbers by providing a transition region in operative connection with a path of relatively reduced strength. The transition region and the path of relatively reduce strength are operatively connected in that the transition region is positioned and oriented such that tearing of the strap begins in the transition region and is directed to and/or continues along the path of relatively reduced strength. In general, the transition region extends toward the path of relatively reduced strength and an end of the transition region is positioned in the vicinity of or at the beginning of the path of relatively reduced strength. The set or predetermined design of the transition regions of the present invention provide a predictable and repeatable load behavior during dynamic initiation of tearing without any pre-tearing step. Subsequently, a generally constant load can be provided over the length the path of relatively reduces strength. In the embodiment of FIGS. 3A through 5G, the thickness of the transition region increases over a length of the transition region. As described above, any change in thickness over the transition region need not be linear or be effected via a continuous or smooth transition.

Figure 6A:
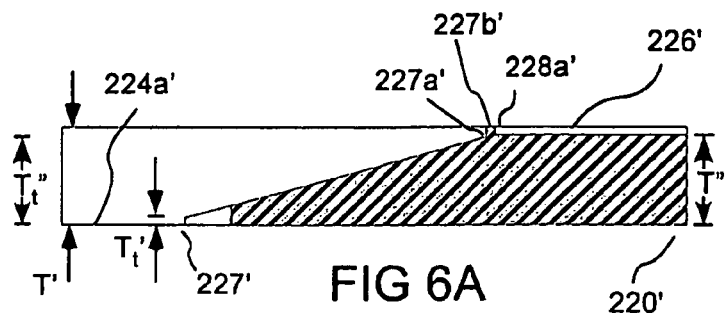
FIG. 6A illustrates an enlarged cross-sectional view a transition region of another embodiment of an energy absorber of the present invention in which the transition region is spaced from the path of relatively reduced strength.

Likewise, the transition from the transition region to the first path need not be linear and/or continuous. For example, FIG. 6A illustrates an embodiment similar to the embodiment of FIGS. 5A through 5F. In the embodiment of FIG. 6A, strap 220' include a step change in thickness at transition initial point 227'. In that regard, at transition point 227', the thickness changes in a stepwise manner (from zero in the illustrated embodiment) by an amount $T_t'$ which is less than the thickness $T_t''$ at end point 227a' at the end of the transition region. In the transition region, between points 227' and 227a', the thickness changes in a linear, ramped manner from $T_t$ to $T_t'$. In the embodiment of FIG. 6A, the transition region is spaced from path or groove 226' (having a thickness T''', which is less than a thickness T' of strap 220) by a short length or intermediate portion of strap 220', represented by designation 227b', having a thickness T'. The intermediate strap portion 227b' preferably has a length small enough that tearing continues thereover from the transition region to groove 226' and an excessive load is not experienced as strap 220' tears over the length thereof (that is, between the transition region and groove 226').

Figure 6B:
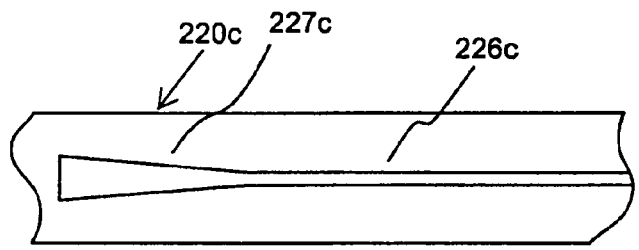
FIG. 6B illustrates a top plan view of a portion of another embodiment of an energy absorber of the present invention wherein the width of a transition region changes over the length thereof.

Strap variables other than or in addition to strap thickness can be changed over a transition region. For example, FIG. 6B illustrates a portion of a strap 220c including a transition region 227c in which the width of a groove or passages is reduced in a generally linear manner until transition regions 227c connects to a path of relatively reduced strength 226c (for example, a groove as described above).

Figure 6C:
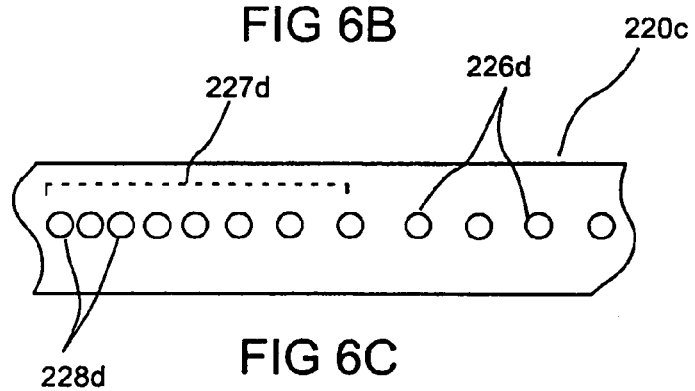
FIG. 6C illustrates a top plan view of a portion of another embodiment of an energy absorber of the present invention wherein a path of relatively reduced strength includes generally evenly spaced passages or holes, and the transition region includes passages or holes, wherein the spacing between the passages of the transition region changes over the length of the transition region.

In the embodiment illustrated in FIG. 6C, a path of relatively reduce strength is formed by spaced passages or holes 226d passing through strap 220d, which are of generally the same size or diameter and are generally evenly spaced. In a transition region, 227d passages 228d (which are generally the same size or diameter as passages 227d) are spaced by a distance that increases as the length of transition region 227d is traversed, resulting in a generally gradual increase of load as strap 220d tears along the transition region 227d.

Figure 6D:
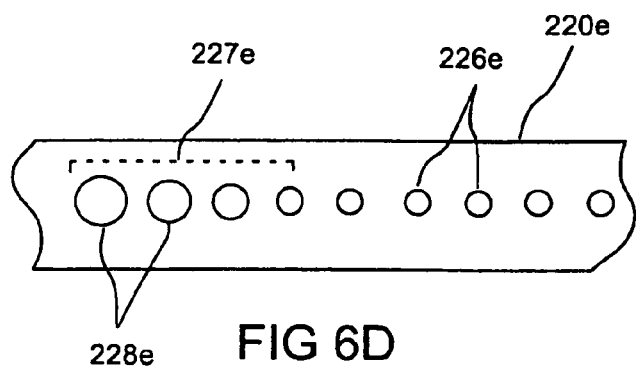
FIG. 6D illustrates a top plan view of a portion of another embodiment of an energy absorber of the present invention wherein a path of relatively reduced strength includes generally evenly spaced passages or holes, and the transition region includes passages or holes which vary in size or diameter over the length of the transition region.
Figure 7:
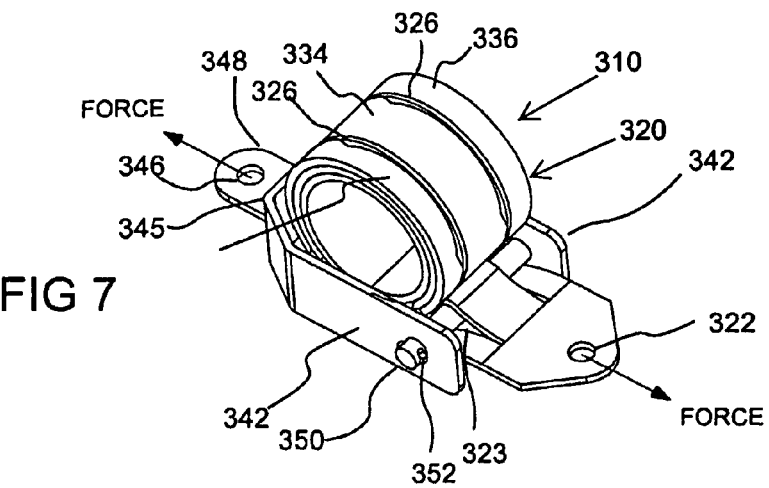
FIG. 7 illustrates a perspective view of a energy absorber assembly of the present invention.

Similar to the embodiment of FIG. 6E, in the embodiment illustrated in FIG. 6D, a path of relatively reduce strength is formed by spaced passages or holes 226e passing through strap 220e, which are of generally the same size or diameter and are generally evenly spaced. In a transition region, 227e passages 228e are positioned generally along a straight line in alignment with passages 226e. Passages 228e gradually decrease in size over the length of transition region 227e and are spaced by a distance that increases as over the length of transition region 227d, resulting in a generally gradual increase of load as strap 220e tears along the transition region 227e.

In several other embodiments, energy absorbers of the present invention include a strap (which can be coiled) that is deformed and torn while being pulled across a stationary element (for example, an element that is connected to a stationary support structure) such as a rod as a result of tension force. Advantages of such energy absorbers of the present invention as compared to currently available energy absorbers in which strips or straps of material are torn or split to absorb energy include, but are not limited to, compactness after deployment or extension, simplicity, and steady tension loads.

For example, another embodiment of an energy absorber assembly or system of the present invention is illustrated in FIGS. 7-14. Energy absorber assembly 310 illustrated in FIG. 1 can, for example, be mounted in series with a horizontal lifeline cable (see FIG. 16A). The cable tension forces are applied to energy absorber assembly 310 at the locations and in the directions indicated by the arrows and the word "FORCE" in FIG. 7 The energy generated from a fall is absorbed by the elongation, deformation and shearing of a strap 320 which is a component of energy absorber assembly 310. The overall dimension of strap 320 can, for example, be the same as or similar to that of straps, 20, 120 and 220.

Figure 8A:
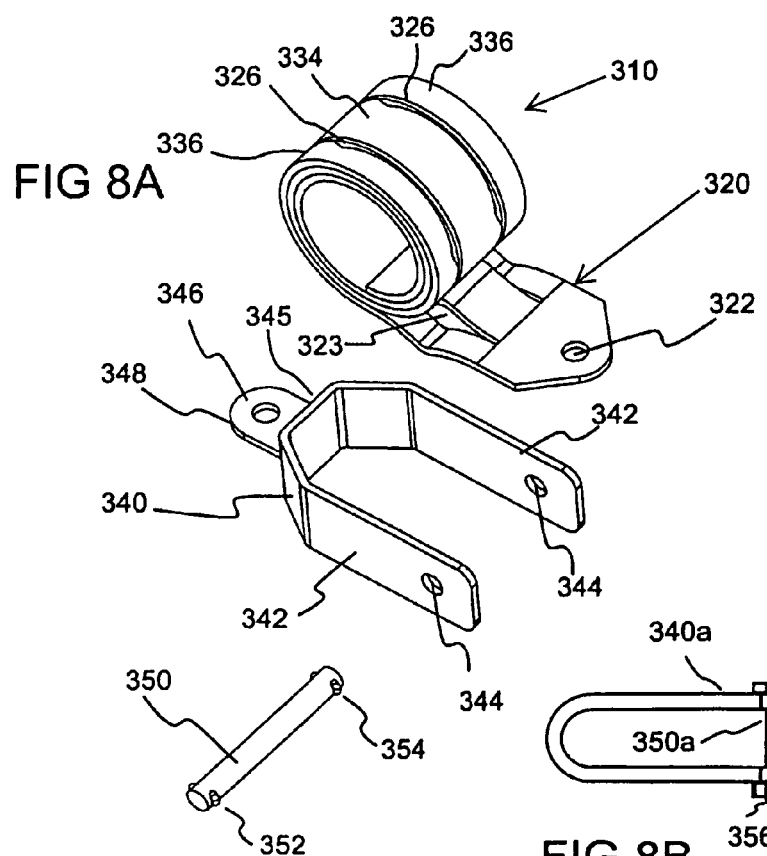
FIG. 8A illustrates a perspective, exploded view of the components of the energy absorber assembly of FIG. 7.

All the components illustrated in FIG. 8A of energy absorber assembly 310 can, for example, be made of a metal such as stainless steel. In the illustrated embodiment, energy assembly 310 includes a connector or support member 340 in the form of a frame which includes seating holes or passages 344 formed in side members 342 to receive and retain an abutment element 350, which can, for example, be slid therethrough during assembly. Retaining elements 352 and 354 extend radially outward at each end of abutment element 350 to retain abutment element 350 in connection with support member 340. Coiled strap 320 is mounted between sides 342 of support 340 and is held within the support member 340 by the cooperation of abutment element 350 with coiled strap 320. In that regard, during assembly abutment element 350 passes through a pre-formed gap 323 in coiled strap 320 and is secured therein by the retaining elements 352 and 354 as described above.

Connector or support member 340 includes a connector element in the form of a passage or hole 348 formed in an extending flange 348. In the illustrated embodiment, flange 358 extends from a cross member 345 that extends between side members 342. Further, strap 320 includes a connector in the form of a passage or hole 322 formed in a first end thereof. Connectors or attachment holes 322 and 346 enable, for example, lifeline cables of a horizontal lifeline system to be serially attached to energy absorber assembly 310.

Figure 8B:
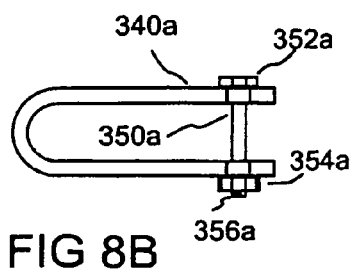
FIG. 8B illustrates an alternative embodiment of a connector or support structure for use in connection with the coiled strap of FIG. 7.

FIG. 8B illustrates an alterative embodiment of a connector or support member 340a in the form of a U-shaped member to which an abutment element 350a (for example, a bolt having a head member 352a at a first end and threading 356a at a second end) is removably attachable (via, for example, a nut 354a). Bolt or abutment member 350a can be inserted into gap 323 as described for abutment element 350.

FIGS. 9A through 10 illustrate strap 320 in an extended state, prior to being coiled for incorporation within energy absorber assembly 310. In the illustrated embodiment, strap includes two slots 324 which extend longitudinally and generally parallel to each other. Slots 324 pass completely through the coiled strap 320.

Strap 320 further includes two generally parallel, longitudinally extending paths or lines of reduced strength (that is, of reduced strength compared to portions of strap 320 not on the path or line) in the form of two grooves 326 which, in the illustrated embodiment, are formed in the upper side of strap 320, collinear with the slots 324. Grooves 326 begin at points 328, corresponding to the ends of slots 324 and extend to points 330 which are spaced from a second end of the coiled strap 320. One or more transitions regions, as described in connection with the embodiments of FIGS. 3A through 6D can be included. In the embodiment, of FIGS. 7 through 14, grooves 326 are of uniform depth and leave thinner sections or webs 332 of material in strap 320 as seen, for example, in the cross-sectional view of FIG. 9D. Slots 324 and grooves 326 divide strap 320 into an inner section 334 and an outer sections 336.

FIG. 11 shows strap 320 after it has been coiled. The coiled arrangement enables entire energy absorber assembly 310 to occupy relatively little space while providing substantial energy absorption capacity. In the region of slots 324, inner section 320a and outer section 320b are bent in opposite directions out of the plane of strap 320 to form a gap 323. In that regard, in the orientation of FIGS. 10 and 11, a portion of center section 334 of coiled strap 320 between slots 324 has been deformed upward, and side sections 336 of the coiled strap 320 laterally outward of the slots 324 have been deformed downward a sufficient distance to create a gap or passage 323 therebetween to enable insertion of abutment element 350 as described above. Slots 324 are, for example, of sufficient length that the operation of forming gap 323 does not cause thin webs 332 to tear or shear.

FIG. 12 shows a side, hidden line view of energy absorber assembly 310 before sufficient tension is applied to cause deformation/tearing. In, for example, the event that a worker connected to a horizontal lifeline system incorporating energy absorber assembly 310 experiences a fall, force is transmitted to energy absorber assembly 310 (via attachment holes 322 and 346), causing tension force to increase. Once the applied tension force equals or exceeds a predetermined threshold value, thin webs 332 (defined by grooves 326) tear, causing slot 320 to expand longitudinally toward the second end of strap 320 and forming a split or gap 338 between the inner section 334 and outer sections 336. Coiled strap 320 concurrently begins to extend or uncoil as the first end thereof moves relative to the abutment element 350, which is fixed or supported by anchored support member 340. The uncoiling of strap 320, the tearing of webs 332 and the associated deformation of inner section 334 and outer section 336 absorbs energy associated with the fall. As known in the fall protection arts, absorption of energy associated with a fall reduces the likelihood of personal injury to the worker as well as reduces the likelihood of damage to other components of the life line system.

FIGS. 13 and 14 show the energy absorber assembly 310 after an applied tension force has pulled strap 320 past abutment element 350 over nearly the full length of grooves 326. While force is applied above the threshold value, split 338 continues to expand until it reaches the end of grooves 326. The expansion causes center section 334 and side sections 336 to separate and deform over the length of grooves 326. The extension of the coiled strap 320 relative to support 340 and the concurrent tearing of webs 332 and deformation of center section 334 and outer sections 336 will cease upon reaching the end of the paths or lines of relatively reduced strength defined by grooves 326. Once fully extended, coiled strap 320 is spent and cannot be reused. In certain situations, it may be possible to reused the remainder of energy absorber assembly 310 by removing retaining elements 352 and 354, removing abutment element 350 and inserting a new coiled strap 320.

Figures 15, 16A:
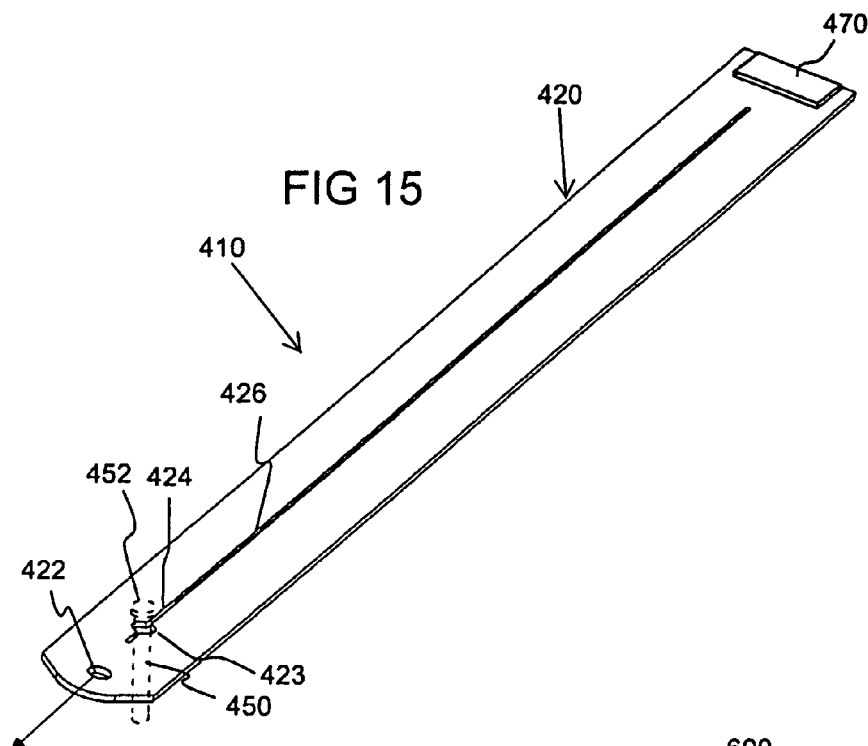
FIG. 15 illustrates another embodiment of an energy absorber of the present invention.
FIG. 16A illustrates a horizontal lifeline system including an energy absorber of the present invention.

FIG. 15 illustrates another embodiment of an energy absorber 410 of the present invention. Similar to energy absorber 310, energy absorber 410 includes a strap 410 having at least one line or path of relatively less strength in the form of, for example, a groove 426. Energy absorber 410 also includes an abutment member in the form of, for example, a rod 450 that can be fixed, connected or anchored (either directly or indirectly) to a support/anchorage. Abut member 450 cooperates with path 426 to tear and/or deform the strap along path 426 when a force above a threshold force is applied to strap 20. In that regard, similar to strap 320, strap 420 includes a passage or hole 422 therethrough to enable attachment of a connector. More than one path 426 and more than one cooperating abutment member 450 can be provided. In the illustrated embodiment, abutment member 450 passes through a passage or hole 423 in operative connection with a slot 424 that is adjacent to and collinear with path 426. Abutment member 450 includes an end member 452 that is larger in width or diameter than hole 423 to ensure that strap 420 remains in operative connection with abutment member 450.

Those skilled in the art can readily adjust the amount of force required to cause tearing and/or deformation of the straps of the present invention (both in the initiation phase of tearing and subsequently) by, for example, selection of material, of material dimension and of the properties of the one or more paths lines of relatively reduced strength. The paths or lines of relatively reduced strength can take any number of forms. For example, grooves can be formed as described above. The depth of the groove can be used to adjust threshold force. Likewise, the profile of the transition from the slot to the groove can be adjusted as discussed above to provide a desired load behavior during the dynamic initiation of tearing phase. In the embodiments of FIGS. 7 through 15, the paths or lines of relatively reduced strength can be formed as slots, which pass completely through the strap, over the any portion of or over the entire length of the strap.

Further the path(s) or line(s) of relatively reduced strength or any portion(s) thereof need not be defined by a continuous path, groove or slot, but can be defined by discontinuities such as spaced groove, slots, holes etc. Moreover, the one or more paths or lines of reduced strength of the present invention can be curvilinear. In cases wherein there are more than one path or line of relatively reduced strength, the lines need not be parallel but can converge and/or diverge in a linear or curvilinear manner over any portion of or over the entire length of the strap. As clear to one skilled in the art in view of the present invention, there are many ways to adjust the threshold value of force and/or to adjust the load value in a controlled manner over the length of the strap. The second end of the strap can be reinforced (for example, by thickening of the material the strap or attachment of another piece of material thereto) to assist in ensuring that tearing and/or deformation ceases before the end of the strap is reached.

As set forth above, the energy absorbers of the present invention can be used in connection with horizontal lifeline systems. FIG. 16A illustrates an embodiment of a horizontal lifeline system 500 of the present invention including energy absorber 10. Horizontal lifeline system is illustrated in operative connection with a concrete beam 600 including generally vertically extending rebar members 610. In the illustrated embodiment, horizontal lifeline systems 500 includes a three stanchions or stanchion systems 510 operatively connected to rebar members 610 via stanchion bases 530. In that regard, each base 530 includes connectors 532 that attach to a rebar member 310 via, for example, bolts (not shown). Each base also includes a stanchion post seating 536 in which a stanchion post 540 can be removably seated (for example, via bolts and cooperating nuts which are not shown in FIG. 16A).

As, for example, illustrated in FIG. 16B, stanchion posts 540 includes an upper member or plate 542 to which a connector 550 is attachable (on end stanchion posts 540). Connector 550 includes longitudinally extending slots 552 formed in section 554 of connector 550. Connector 550 further includes attachment members 556 (for example, bolts or pins) that cooperate with holes or passages 544 in member 540 and cooperating attachment members 558 (for example, nuts or cotter-pins) to slidably attach connector 550 to upper member 542. Bolts 556 and nuts 558 are connected so that connector 550 can move, slide or float in the directions of the arrows illustrated in FIG. 16C. In that regard, in the illustrated embodiment, relatively or generally flat first section 554 of connector 550 slides over the upper, relatively flat surface of upper member 542. While bolts 556 retain connector 550 in operative connection with upper member 540, extending slots 552 allow connector 550 to slide relative to bolts 556 and upper member 540.

FIG. 16B illustrates an enlarged perspective view the upper end of the right side end stanchion post 540 from FIG. 16A. On a first end, connector 550 is attached to horizontal lifeline 520 via a connector 570 including, for example, a bolt 572 which passes through a first attachment element in the form of, for example, a hole or passage 560 formed in first section 554 of connector 550. On a second end, connector 550 is connected to an end anchor 580 (which is secured to rebar members 610 as, for example, described for stanchion bases 630) via an anchor member 590. In the illustrated embodiment, anchor member 590 included a connector 592 on a first end thereof to secure the anchor base member 580 to a hole or passage 582 formed therein. On a second end, anchor member 590 includes a generally J-shaped connector 594 attached thereto (formed, for example, by bending a generally cylindrical steel bar). Connector 592 can, for example, be attached to connector 594 via an intermediate steel cable or link chain. Connector 594 of anchor member 590 is seated in a second attachment element in the form of a passage or seating 562 (see, for example, FIGS. 17A and 17B) formed in a second section 564 of connector 550. Second section 564 is formed at an angle to first section 552 that can, for example, be approximately equal to the angle at which anchor member 590 extends from connector 550 to anchor base member 580. Seating 562 includes a relatively large passage 566 formed in second section 564 to facilitate connection of connector 594. Passage 566 is in operative connection with a slot 568 into which connector 594 is securely seated.

Because connector 550 can move, float or slide relative to post 540, forces on horizontal lifeline 520 are readily transferred via anchoring line 590 to anchor base member 580, while limiting the force transferred to end stanchion 540. The limitation of forces transferred to stanchion 540 afforded by connector 550 and the energy absorbed by energy absorber 10 assist in preventing damage to or failure of stanchions 540 during a fall by an attached user in which relatively large forces can be transferred to horizontal lifeline 520.

In the case of the left side end stanchion post 540 of FIG. 16A, a second connector 550 is attached to energy absorber 10 (for example, via passage 40 on first section 34) using a connector 570*a* (for example, identical to connector 570) in cooperation with first attachment element 560 of connector 550. On an opposite end thereof, connector 550 is connected to an end anchor 580 as described above. Horizontal lifeline 520 is attached to energy absorber 10 by a connector 570*b* (for example, via passage 42 of second section 36 of energy absorber 10). As discussed above, energy or shock absorber 10 absorbs energy transferred to horizontal lifeline 520 in the case of a fall of a user operatively connected (for example, via a lifeline connected to a safety harness worn by the user) to horizontal lifeline 520.

Figure 18A:
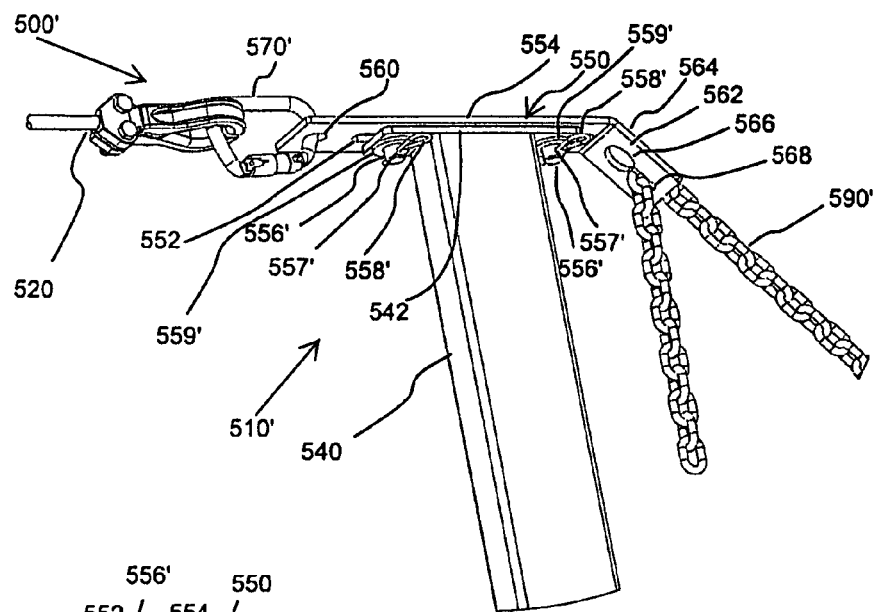
FIG. 18A illustrates a bottom perspective view of a stanchion of the present invention including the connector of FIG. 17A wherein the connector is attached to the stanchion post with a pin and cotter pin assembly.
Figure 18B:
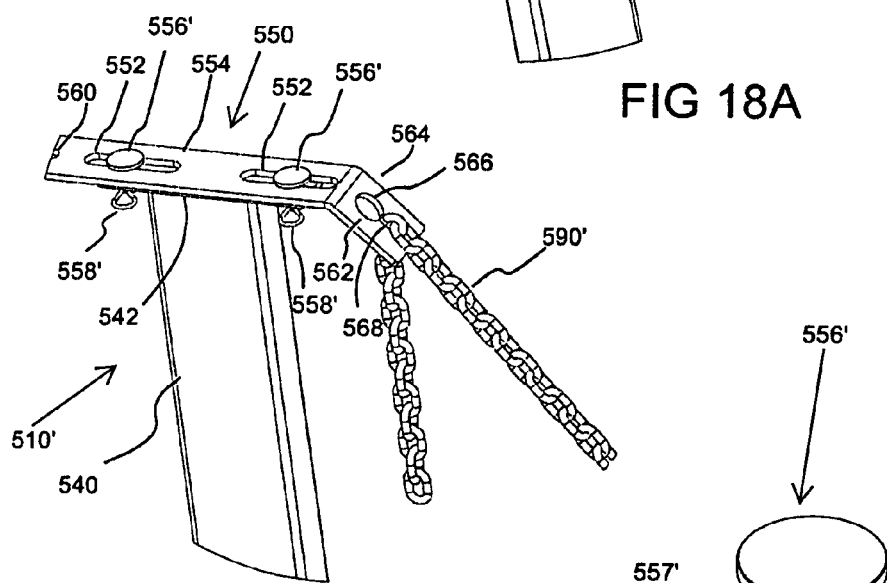
FIG. 18B illustrates a top perspective view of the stanchion of FIG. 17A.
Figure 18C:
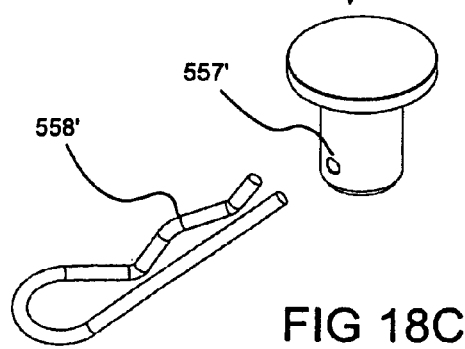
FIG. 18C illustrates an enlarged view of the pin and cotter pin assembly of FIG. 17A.

As clear to those skilled in the art, various connection or attachment mechanisms and anchor mechanisms can be used with connector 550. In that regard, FIGS. 18A through 18C illustrates a portion of another embodiment of a horizontal lifeline system 500' of the present invention including a stanchion or stanchion system 510' of the present invention. In stanchion system 510', connector 550 is attached to upper member 542 or stanchion post 540 via pins 556' which pass through slots 552 of connector 550 and holes 544 (not shown in FIGS. 18A and 18B) of upper member 542. Pins 556' include passages 557' which cooperate with retainers such as cotter pins 558' to retain pins 556' in connection with connector 550 and upper member 542. A washer 559' can also be included to assist in forming a secure, sliding connection between connector 550 and upper member 542 as described above.

In the embodiment of FIGS. 18A through 18C, horizontal lifeline 520 is connected to passage 560 of connector 550 via a carabiner 570'. Further, anchor member 590' is a linked chain. Chain 590' is seated in seating 562 of second section 564. Relatively large passage 566 formed in second section 564 facilitates connection of chain 590'. As illustrated in FIGS. 18A and 18B, passage or slot 566 is dimensioned (for example, slightly wider than the diameter of the chain links of chain 590') to securely seat a link of chain 590'.

Figure 19A:
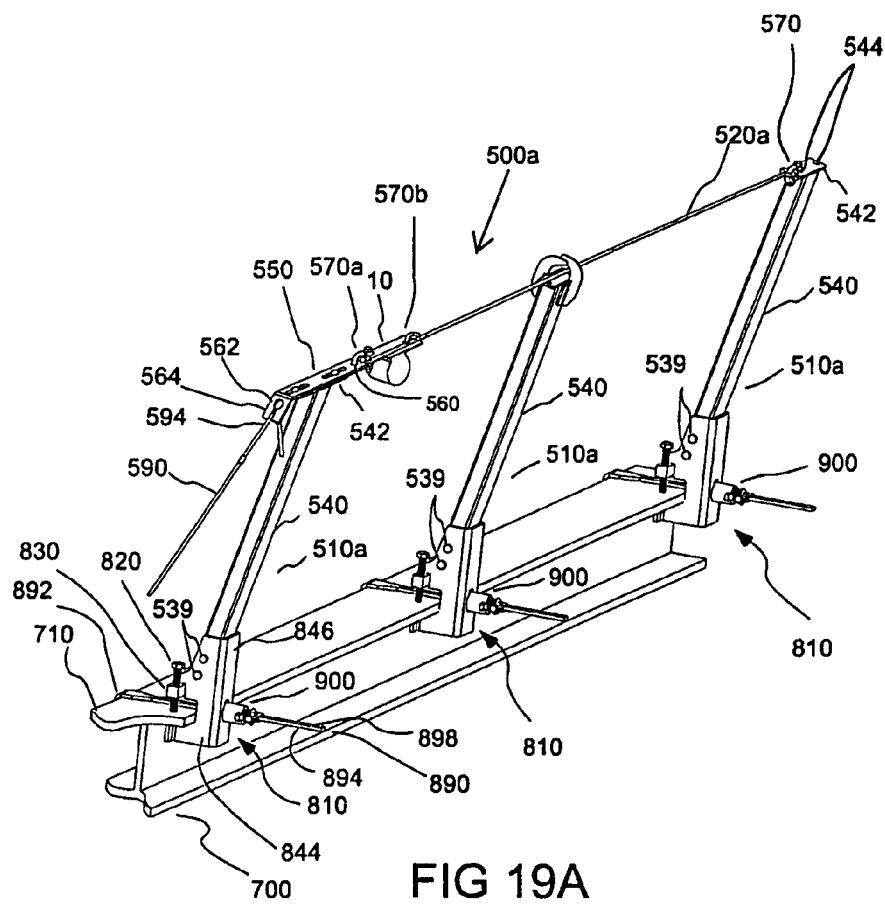
FIG. 19A illustrates a perspective view of another embodiment of a horizontal lifeline system of the present invention attached to an I-beam.
Figure 19B:
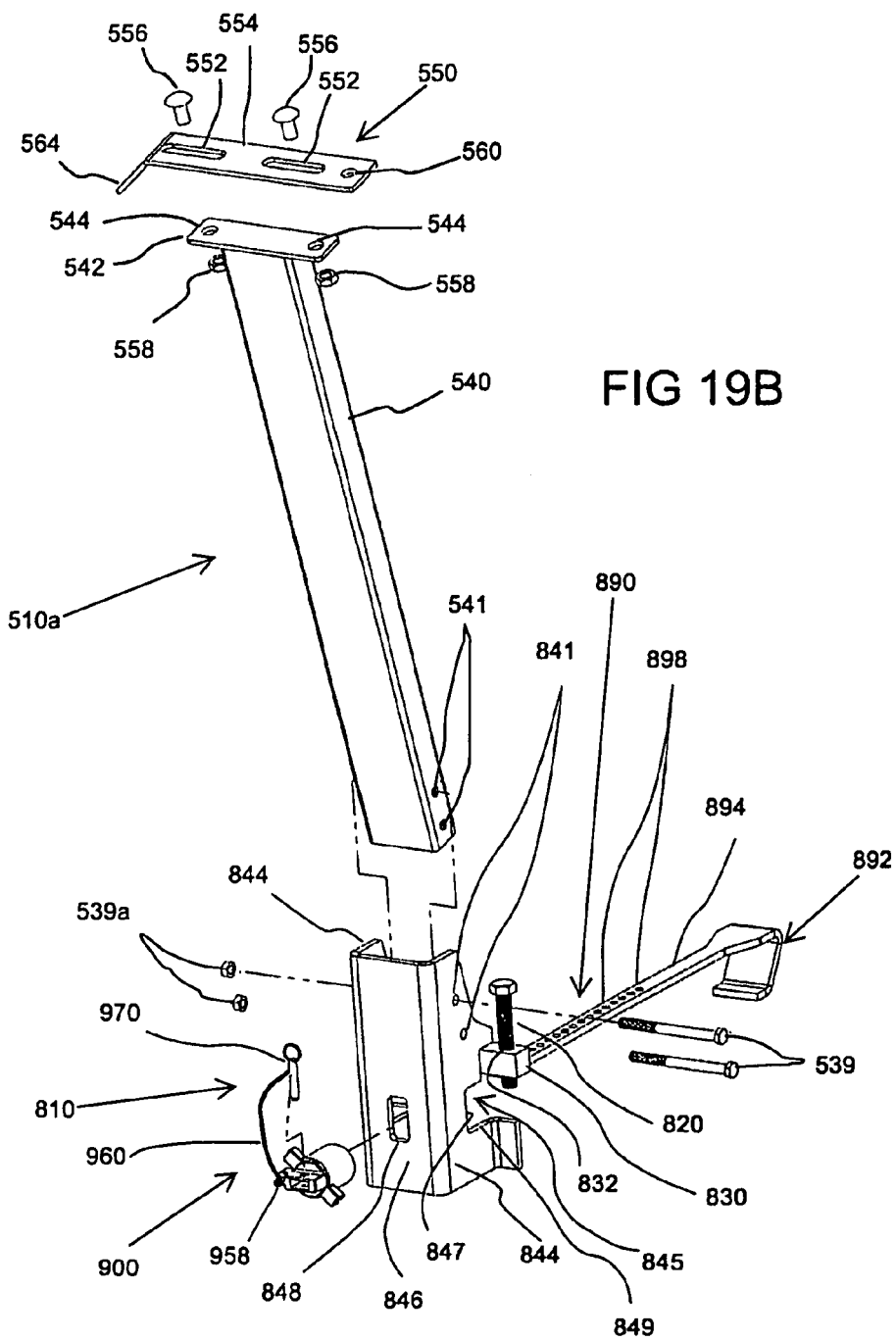
FIG. 19B illustrates an enlarged perspective view of a stanchion of the present invention including a connector, a stanchion post and a base for attachment to an I-beam as illustrated in FIG. 19A.
Figure 19C:
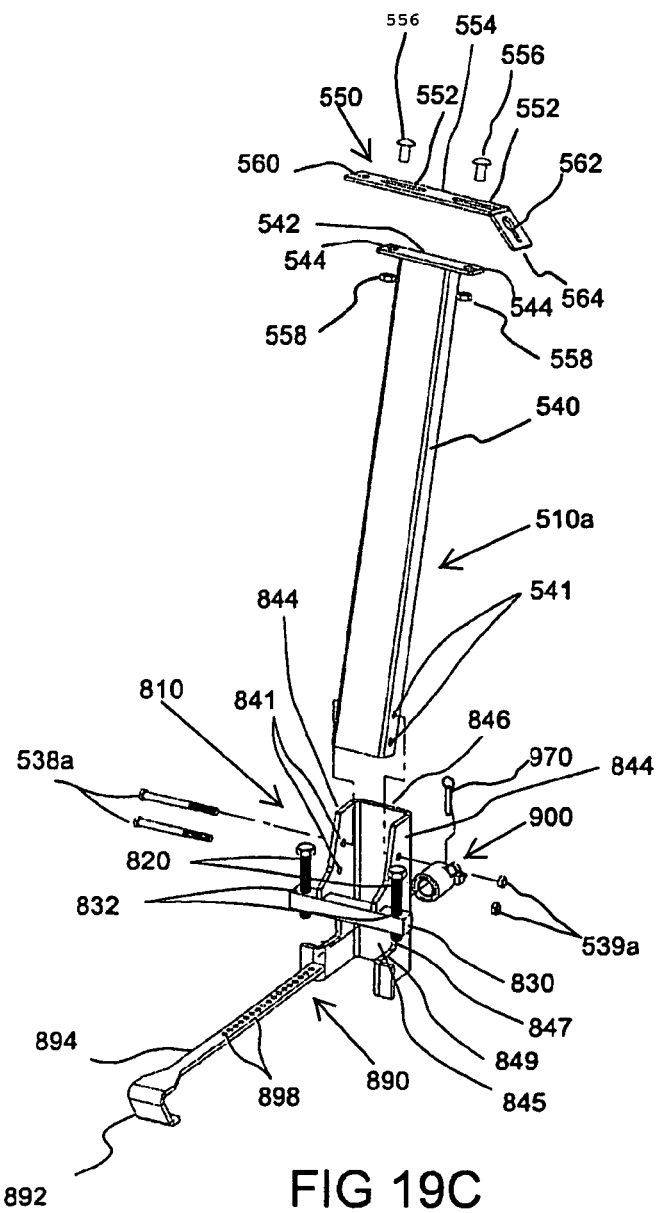
FIG. 19C illustrates another perspective view of the stanchion of FIG. 19A.
Figure 22A:
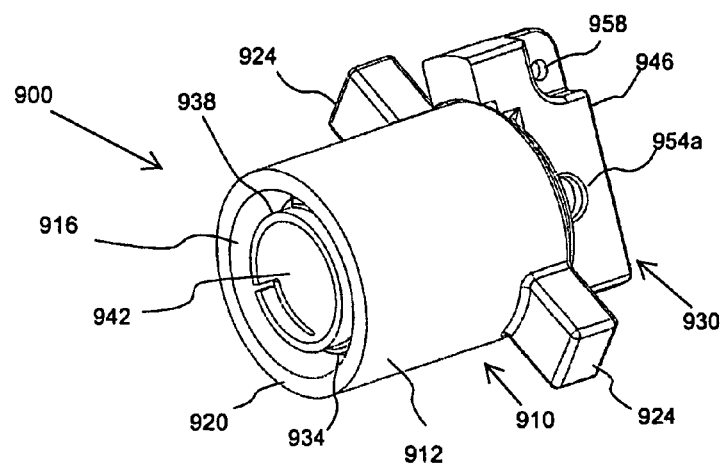
FIG. 22A illustrates an enlarged front perspective view of the crossbar connector in a fully contracted state.
Figure 22B:
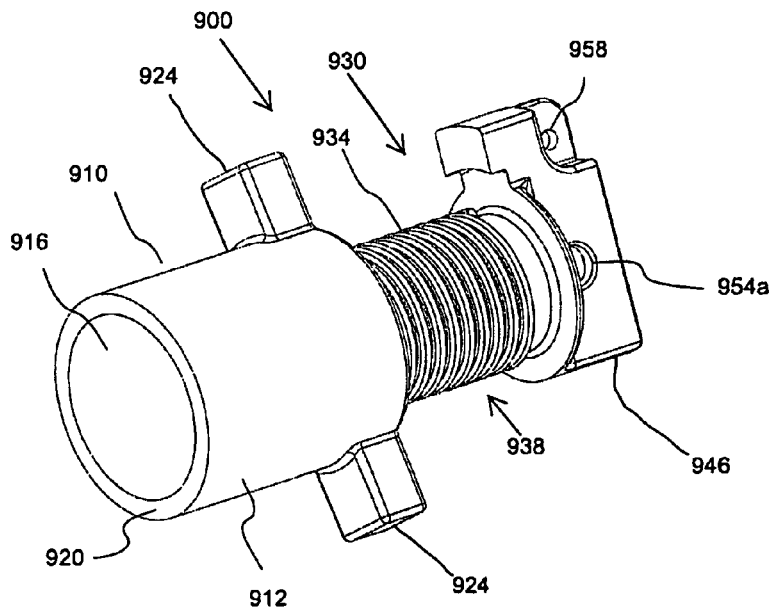
FIG. 22B illustrates an enlarged front perspective view of the crossbar connector in a fully expanded state.

The stanchion systems and associated connectors and energy absorbers of the present invention can be used in a variety of work environments. FIGS. 19A through 19C, for example, illustrate another embodiment of a horizontal lifeline system 500a of the present invention in operative connection with an upper flange 710 of an I-beam 700. Horizontal lifeline system 500a includes stanchion systems 510a that support a horizontal lifeline 520a. The left end stanchion system 510a of FIG. 19A is illustrated to have connector 550 and associated end anchor member 590 in operative connection with upper member 542 thereof as discussed above. Energy absorber 10, connector 550 and horizontal lifeline 520 are connected in series to left end stanchion system 510a as described in connection with FIG. 16A. However, in the embodiment of horizontal lifeline system 500a, connector 550 and anchor member 590 can be omitted from end stanchion systems 510a. As, for example, illustrated in the case of the right end stanchion system 510a of FIG. 19A, horizontal lifeline 520a (or energy absorber 10) can be connected directly to upper member 542 via one of passages or holes 544 formed therein.

Each stanchion system 510a includes a base 810a that is operable to attached to flange 710 of I-beam 700. The operation of various elements of base 130a is, for example, described in copending U.S. patent application Ser. No. 12/366,649, filed on the same date as the present application, the disclosure of which is incorporated herein by reference.

In the embodiment illustrated in FIGS. 19A through 19C, stanchion system 510a includes an attachment system 810 to attach stanchion system 510a to a support such as a flanged support (for example, a flanged beam such as I-beam 700) and an extending stanchion post 540 as described above that is removably attachable to attachment system 810. Attachment system 810 includes at least one clamp mechanism or clamp member 820, a base or body 840, a crossbar 890 and a crossbar connector 900. Attachment system 810 also includes a post attachment or seating to connect (for example, removably connect) stanchion post 540 or an/or another element to attachment system 810.

Attachment system 810 includes a mechanism that allows attachment system 810 to be securely attached to the support (for example, I-beam 700) by a user working above the support. Thus, the user does not have to reach under attachment system 810 or any portion of the support to which attachment system 810 is connected to secure that connection. In the embodiment illustrated in FIGS. 19A through 19C, clamp members include threaded bolts 820 that can be raised or lowered relative to upper flange 710 of I-beam 700 to which attachment system 810 is connected. As illustrated in FIG. 19A, threaded bolts 810 are tightened against an upper surface of flange 710 to abut and apply force to the upper surface of flange 710. In the illustrated embodiment, clamp members 820 pass through threaded holes 832 formed in a support or clamp member or bar 830 that is attached to (for example, welded to) or formed integrally with base 840. Clamp bar 830 extends laterally beyond the position of side members 844 of base 840. Side members 844 of base 840 (which are connected by a transverse back member 846) include a generally C-shaped seating 845 in which a rearward end or edge of flange 710 is seated (against back or rearward surfaces 847 of seatings 845 of side members 844). Threaded bolts 820 are adjusted relative to clamp bar 830 to apply force to the upper surface of flange 710, thereby forcing or clamping flange 710 against an upward facing, clamping surface 849 of each of side members 844. In one embodiment, base 840, including side members 844 and transverse member 846 and components thereof, was formed (integrally) from a single piece of metal (for example, stainless steel).

Crossbar 890 is slidably movable through a passage 848 formed in transverse member 846. As illustrated in FIG. 19A, crossbar 890 abuts a first or forward edge of an upper flange 710 of an I-beam 500 via, for example, generally hook-shaped abutment or clamping member 892 on a first or forward end of an extending section 894 of crossbar 890. Abutment member 892 abuts and can apply force to the first edge of flange 710, securing second or rearward edge of flange 710 against surfaces 847 of side members 844 of base 840, to assist in securely mounting stanchion system 510a to I-beam 500.

Crossbar 890 is thus movable or slidable through passage 848b in a direction generally parallel to the upper surface of upper flange 710 so that, for example, the position of abutment member 892 can be readily adjusted to abut the first or forward edge of flange 710. Passage 848 can also extend in a generally vertical direction so that crossbar 890 is also movable therein in a direction generally perpendicular to the upper surface of flange 710 to, for example, enable secure attachment to flanges of varying thickness.

Extending section 894 passes over the upper surface of flange 710 and through passage 848 to form a connection with connector 900, which is operable to adjust the position of abutment member 892 relative to connector 900 and base 840. As illustrated, for example, in FIGS. 20A through 23, connector 900 includes a first member or section 910 and a second member or section 930. As, for example, illustrated in FIG. 23, first section 910 and second section 930 are connected via threading 914 formed around at least a portion of a generally cylindrical passage 916 (see, for example, FIG. 23) of generally cylindrical section 912 of first section 910 and cooperating threading 934 formed on a generally cylindrical extending section 938 of second section 930. Forming at least a portion of first section 910 and a portion of second section 930 as generally concentric cylinders through which extending section 894 can pass affords compactness, efficiency in positioning connector 900 on extending section 894, and efficiency in providing relative movement between end member 946 of second section 930 and a forward or abutment surface 920 of first section 910 to form a secure connection as discussed below. Although second section 930 is shown to be threadably engaged within a portion of first section 910 in the illustrated embodiment, one skilled in the art appreciates that the first and second sections can be dimensioned and designed so that the first/forward section is threadably engaged within a portion of the second/rearward section.

During installation of stanchion system 510a, connector 900 is slid over extending section 894 of crossbar 890 so that extending section 894 passes through passage 916 of first section 910 and passage 942 (see, for example, FIG. 22A) formed through section 938 of second section 930 (which is at least partially positioned within passage 916). First section 930 includes a connection or attachment mechanism that attaches connector at a desired incremental position on extending section 894. In the illustrated embodiment, extending section 894 exits second section 930 via a passage 950 (see, for example, FIGS. 20A and 20B), which is a portion of or in communicative connection with passage 942, and is formed in an end member 946 of second section 930. End member 946 includes holes or passages 954a and 954b formed on each side of passage 950. A locking member such as a ring pin 970 can be slid through one of holes 954a and 954b to pass through one of holes or passages 898 formed along the length of extending member 894 and then through the other of holes 954a and 954b to connect connector 800 to extending section 994. The choice of one of holes 898 provides incremental adjustment of the position abutment member 892. Pin 970 can, for example, include a spring loaded abutment element 974 as know in the art to ensure that pin 970 is not accidentally removed from connection with end member 946 and extending bar 894. End member 946 can, for example, include an attachment element such as a hole or passage 958 via which pin 970 can be attached to end member 946 via a tether 960 (see FIG. 19A) so that pin 970 is readily available for insertion within holes 954a and 954b as described above.

Other types of, for example, abutting or interlocking connections between second section 930 and extending section 894 as known in the connector arts can be made to position second section 930 at one of a plurality of positions on extending section 894. Once end member 946 is fixed in one of the plurality of positions relative to extending section 894, first section 910 is movable relative to second section 930 (via threading 914 and cooperating threading 934) to adjust the position of a forward or abutment surface 920 of first section 910 so that it firmly abuts traverse member 846 of base 840. First section 110 can include extending flanges 924 to facilitate rotation thereof by an installer of stanchion system 510a. The ability to adjust the position of first section 910 relative to second section 930 (and relative to abutment member 892) provides fine tuning or adjustment of the position of abutment member 892 of crossbar 890 and the force applied thereby upon the first edge of flange 710.

The fine adjustment provided by first section 910 of connector 900 enables a more secure connection of attachment system 810 and stanchion system 510a to a flanged support or anchor than is possible with many currently available stanchion systems. The motion of first section 910 relative to second section 930 provides adjustment of the position of abutment member 892 relative to, for example, abutment surfaces 847, to positions between the incrementally spaced positioning provided by the cooperation of pin 970, second section 930 and holes 898 of extending section 894. In the illustrated embodiment, the cooperation of threading 914 and 934 provides continuous adjustment of position to any position between the incremental positions provided by holes 898.

A number of currently available stanchion systems include a crossbar member that is threaded so that a threaded connector can be threaded onto the back thereof and advanced to lock the crossbar in place. Connector 900 of the present invention provides the continuous adjustability of a threaded connecter but, unlike previous threaded connectors, does not need to be threaded onto a crossbar member at the start of installation, which can be very cumbersome and time consuming. Moreover, connector 900 does not need to be rotated/threaded over the entire length of the crossbar for advancement to secure the stanchion system. Crossbars can, for example, be up to 36 inches in length and it can take some time to thread currently available threaded connectors to a desired position.

Connector 900 provides for easy and quick initial installation on crossbar 890. Once connector 900 is slid onto the end of extending section 894 of crossbar 890, one can then quickly slide connector 900 to a desired incremental position on extending section 894 (without rotating/threading) until a relatively close fit is obtained. The user can then quickly drop pin 970 into respective aligned hole 898 and turn first section 910 only, for example, a few turns for secure abutment with transverse member 846. Moreover, even if first section 910 of connector 900 should accidentally be rotated out of abutment with transverse member 846, the locked position of second section 930 maintains connector 900 in relatively close connection with transverse member 846 via an abutment or interlocking connection as, for example, created by the cooperation of pin 970 with holes 954a, 954b and 898.

Stanchion post 540 can, for example, be attached to a generally U-shaped stanchion post seating formed by spaced side members 844 and transverse member 846 once attachment system 810 is secured to beam 700 as described above. As illustrated, for example, in FIGS. 19A through 19C, bolts 539 can be passed through passages 841 in side members 844 and through aligned passages 541 in stanchion 540 to cooperate with nuts 539a to removably connect stanchion 540 to base 810.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. An energy absorber, comprising:
   a strap comprising a groove defining at least a first path of relatively reduced strength extending over at least a portion of a length of the strap, and
   the groove further defining at least a first transition region comprising a first initial point where tearing begins along the first transition region when a force above a threshold force is applied and a first end point, the first end point being in operative connection with a first point on the first path so that tearing continues along the first path after tearing along the first transition region, a gradual increase in load occurring as tearing occurs along the transition region,
   wherein a thickness of the strap in the first transition region has a first initial thickness at the first initial point and a first end thickness at the first end point; and
   the first transition region further comprises a step change in thickness from zero to the first initial thickness at the first initial point of the first transition region, and a first transition thickness of the strap in the first transition region is non-uniform between the first initial point and the first end point and the first transition region thickness increases gradually from the first initial thickness to the first end thickness which is equal to a path thickness of the strap at the first point on the first path.

2. The energy absorber of claim 1 wherein the first initial thickness is greater than zero.

3. The energy absorber of claim 1 wherein the strap is a metal strap comprising a first end, a second end, and an intermediate section between the first end and the second end, the strap a generally U-shaped slot passing through the strap in the first end that separates the first end into a first connector section and a second connector section, the first connector section and the second connector section being deformed to extend in different directions away from one another, a first connector passage being formed in the first connector section and a second connector passage being formed in the second connector section, the first transition region extending from the vicinity of a first end of the slot to a vicinity of the first point on the first path, another groove defining a second transition region and a second path of relatively reduced strength, the second transition region extending from a vicinity of a second end of the slot to a vicinity of a first point on the second path of relatively reduced strength, so that tearing continues along the second path after tearing along the second transition region, a second transition thickness of the strap increasing over a length of the second transition region from a second initial thickness at a second initial point of the second transition region to a second end thickness at a second end point of the second transition region which is greater than the second initial thickness of the second transition region, a gradual increase in load occurring as tearing occurs along the second transition region when a force above a threshold force is applied.

4. The energy absorber of claim 3 wherein the first path and the second path comprise regions of decreased thickness formed in the strap.

5. The energy absorber of claim 4 wherein the first path has a generally constant first path thickness over a length thereof and the second path has a generally constant second path thickness over a length thereof.

6. The energy absorber of claim 3 wherein the first path extends from the end point of the first transition region to a position proximate the second end of the strap and the second path extends from the end point of the second transition region to a position proximate the second end of the strap, and the second end of the strap and a portion of the intermediate portion of the strap are coiled in a spiral fashion inside a remainder of the intermediate portion of the strap, whereby when the first connector section and the second connector section are pulled in opposite directions with sufficient force, the connector tears and uncoils to absorb energy.

7. The energy absorber of claim 6 wherein the first path and the second path comprise regions of decreased thickness formed in the strap.

8. The energy absorber of claim 7 wherein the first path has a generally constant first path thickness over a length thereof and the second path has a generally constant second path thickness over a length thereof.

9. The energy absorber of claim 3 wherein the second transition region comprises a step change in thickness from zero to the second initial thickness at the second initial paint of the second transition region, and the second transition thickness of the strap in the second transition region increases from the second initial thickness to the second end thickness which is equal to a second path thickness of the strap at the first point on the second path.

10. The energy absorber of claim 1 in combination with a horizontal lifeline and at least one stanchion system, the stanchion system comprises a stanchion post and a connector movably connected to the stanchion post, the connector comprising a first connector element to be operatively connected to the horizontal lifeline and a second connector element to connect to an anchor.

11. The horizontal lifeline system of claim 10 wherein the connector comprises at least a first extending slot, the stanchion system further comprising a first attachment member that passes through the first slot to connect the connector to the stanchion post so that the connector can slide relative to the first attachment member along a length of the first slot.

12. The horizontal lifeline system of claim 10 wherein the connector and the energy absorber are in operative connection with the horizontal lifeline in series.

13. The horizontal lifeline system of claim 10 wherein the connector and the energy absorber are in adjacent connection with each other.

\* \* \* \* \*